US012413472B2

(12) United States Patent
Takano et al.

(10) Patent No.: US 12,413,472 B2
(45) Date of Patent: Sep. 9, 2025

(54) CONTROL APPARATUS IN COMMUNICATION SYSTEM AND CONTROL METHOD THEREFOR

(71) Applicant: Sony Group Corporation, Tokyo (JP)

(72) Inventors: Hiroaki Takano, Tokyo (JP); Hiroto Kuriki, Tokyo (JP); Shinichiro Tsuda, Tokyo (JP); Tomoaki Matsumura, Tokyo (JP); Hirofumi Kasai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 471 days.

(21) Appl. No.: 18/001,475

(22) PCT Filed: Apr. 28, 2021

(86) PCT No.: PCT/JP2021/016884
§ 371 (c)(1),
(2) Date: Dec. 12, 2022

(87) PCT Pub. No.: WO2021/261074
PCT Pub. Date: Dec. 30, 2021

(65) Prior Publication Data
US 2023/0224218 A1    Jul. 13, 2023

(30) Foreign Application Priority Data

Jun. 26, 2020 (JP) ................................. 2020-110153

(51) Int. Cl.
*H04W 24/08* (2009.01)
*H04L 41/082* (2022.01)
*H04W 84/12* (2009.01)

(52) U.S. Cl.
CPC ........... *H04L 41/082* (2013.01); *H04W 24/08* (2013.01); *H04W 84/12* (2013.01)

(58) Field of Classification Search
CPC ......... H04L 12/28; H04L 12/50; H04W 24/08
(Continued)

(56) References Cited

U.S. PATENT DOCUMENTS

| 12,069,658 B2 * | 8/2024 | Takano ................. H04W 72/02 |
| 2020/0068587 A1 | 2/2020 | Garcia Azorero et al. |
| 2020/0178196 A1 | 6/2020 | Wang et al. |

FOREIGN PATENT DOCUMENTS

CN      111034250 A      4/2020

OTHER PUBLICATIONS

International Search Report and Written Opinion mailed on Jul. 20, 2021, received for PCT Application PCT/JP2021/016884, filed on Apr. 28, 2021, 8 pages including English Translation.
(Continued)

*Primary Examiner* — Dang T Ton
(74) *Attorney, Agent, or Firm* — XSENSUS LLP

(57) ABSTRACT

To flexibly control the number of user planes in a communication system.
In the communication system, a base station located on a local area network is connected to at least one user plane function located on a cloud. Whether or not to add a new user plane function is determined in consideration of an amount of traffic of user data and an assumed amount of traffic of the new user plane function out of a maximum amount of traffic on the local area network, the user data being transferred by the at least one user plane function by use of the local area network.

15 Claims, 16 Drawing Sheets

(58) Field of Classification Search
USPC ................................. 370/329, 401, 402, 403
See application file for complete search history.

(56) References Cited

OTHER PUBLICATIONS

3GPP, "General Packet Radio Service (GPRS) enhancements for Evolved Universal Terrestrial Radio Access Network (E-UTRAN) access (Release 13)", 3GPP TS 23.401 V13.8.0, Sep. 2016, pp. 1-373.
ETSI, "System Architecture for the 5G System", 3GPP TS 23.501, Version 15.2.0, Release 15, Jun. 2018, pp. 1-218.
Nokia et al., "Correction to N16a for the transfer of N4 requests from SMF/responses from local UPF", 3GPP TSG SA WG2 Meeting #136, S2-1912165, Nov. 18-22, 2019, 30 pages.

* cited by examiner

FIG. 10

| UPF ID | AMOUNT OF TRAFFIC TO VIRTUAL MACHINE IN SUBNET TO WHICH EACH UPF BELONGS (DOWNLINK/UPLINK) |
|---|---|
| 1 | 1.0 Gbps |
| 2 | 1.5 Gbps (MAXIMUM VALUE: MAXIMUM AMOUNT OF TRAFFIC FLOWING FROM LAN TO CLOUD) |
| ⋮ | ⋮ |
| 32 | 700 Mbps |

FIG. 13

| UPF ID | AMOUNT OF TRAFFIC OF USER DATA IN OPERATION | |
|---|---|---|
| | DOWNLINK | UPLINK |
| 1 | 20 Mbps | 10 Mbps |
| 2 | 30 Mbps | 15 Mbps |
| ⋮ | ⋮ | ⋮ |
| 32 | 80 Mbps | 10 Mbps |

CONTROL APPARATUS IN COMMUNICATION SYSTEM AND CONTROL METHOD THEREFOR

CROSS-REFERENCE TO RELATED APPLICATIONS

The present application is based on PCT filing PCT/JP2021/016884, filed Apr. 28, 2021, which claims priority to JP 2020-110153, filed Jun. 26, 2020, the entire contents of each are incorporated herein by reference.

TECHNICAL FIELD

The present technology relates to a control apparatus in a communication system. Specifically, the present technology relates to a control apparatus that manages resources that can be used in a communication system, and a control method therefor.

BACKGROUND ART

A cellular network includes a radio access network (RAN) and a core network (CN). The RAN is a wireless system between a base station (BS) and a terminal (user equipment (UE)). The core network mainly gives the terminal permission to connect to a network, and performs session management. In 4G and 5G, the core network includes a control plane function (CPF) and a user plane function (UPF). In a case where the terminal connects to the network to transmit and receive data, a function of a user plane of the core network is required. In the case of 4G, SGW and PGW fulfils this role. In the case of 5G, the user plane function fulfils this role.

In order to allocate a user plane to a terminal that has been attached to a network in 4G, a selection function determines an SGW and a PGW to be allocated to the terminal according to the current state of the network. Then, on the basis of information thereon, a clay pipe called a GTP tunnel is provided between the base station and the SGW and between the base station and the PGW, as a request from an MME. Here, the PGW is selected on the basis of an APN set by the terminal. In addition, the SGW is selected according to the geographical location of the terminal (see, for example, Non Patent Document 1).

Furthermore, in 5G, information called network slice selection assistance information (NSSAI) is provided to the terminal, and information as to which network slice can be selected is provided to the terminal. A network slice selection function (NSSF) allocates, to the terminal, a user plane function corresponding to a network slice selected by the terminal (see, for example, Non Patent Document 2).

CITATION LIST

Non Patent Document

Non Patent Document 1: 3GPP T523.401, Section 4.3.8
Non Patent Document 2: 3GPP T523.501, Section 5.15

SUMMARY OF THE INVENTION

Problems to be Solved by the Invention

In order to ensure throughput according to the number of terminals in the above-described conventional technique, it is useful to increase or decrease the number of user planes according to a change in the number of terminals. However, in the above-described conventional technique, it is difficult to flexibly increase or decrease the number of user planes. In particular, a core network for a recent local cellular system needs to be implemented at low cost, and it is not desirable to provide a complicated mechanism.

The present technology has been made in view of such a situation, and an object of the present technology is to flexibly control the number of user planes in a communication system.

Solutions to Problems

The present technology has been made to solve the above-described problems, and a first aspect of the present technology is a control apparatus and a control method therefor to be used in a communication system in which a base station and at least one user plane function are connected, the base station being located on a local area network, the at least one user plane function being located on a cloud, in which whether or not to add a new user plane function is determined in consideration of an amount of traffic of user data and an assumed amount of traffic of the new user plane function out of a maximum amount of traffic on the local area network, the user data being transferred by the at least one user plane function by use of the local area network. This produces an effect of determining whether or not to add a new user plane function in consideration of the amount of traffic available to the new user plane function in the maximum amount of traffic on the local area network.

Furthermore, in the first aspect, whether or not to add the new user plane function may be determined in a case where a processing usage rate of a target user plane function exceeds a predetermined threshold, the target user plane function being among the at least one user plane function. This produces an effect of determining whether or not to add a new user plane function when a processing usage rate of a user plane function in operation becomes high.

Moreover, in the first aspect, the processing usage rate of the target user plane function is assumed to be a value to be obtained by division of a current processing capacity of the target user plane function by an assumed amount of traffic of the target user plane function.

Furthermore, in the first aspect, the processing usage rate of the target user plane function is assumed to be a value to be calculated on an assumption that the processing usage rate of the target user plane function increases as a longer processing delay is caused in the target user plane function.

Furthermore, in the first aspect, the maximum amount of traffic on the local area network is assumed to be a largest value of respective amounts of traffic of the at least one user plane function, the respective amounts of traffic being measured for communication with an entity located on the local area network.

Furthermore, in the first aspect, the amount of traffic of the user data is assumed to be a sum of respective amounts of traffic of the at least one user plane function, the respective amounts of traffic being measured for communication performed by a terminal via the base station.

Moreover, in the first aspect, an amount of room for increasing traffic may be calculated from the maximum amount of traffic on the local area network such that in a case where a value obtained by division of the amount of room for increasing traffic by the assumed amount of traffic of the new user plane function exceeds a predetermined value, it is determined that the new user plane function should be added. Here, the amount of room for increasing traffic may be a value to be obtained by subtraction of the amount of traffic of the user data from the maximum amount of traffic on the local area network. In addition, the amount of room for increasing traffic may be a value to be obtained by subtraction of a traffic amount corresponding to a number of the at least one user plane function from the maximum amount of traffic on the local area network. Note that the predetermined value is assumed to be equal to or greater than 1.

Furthermore, in the first aspect, it may be determined that the new user plane function should be added, in a case where a traffic amount measured for a virtual machine in a subnet belonging to the new user plane function exceeds the assumed amount of traffic of the new user plane function, the traffic amount being measured at an entity located on the local area network. This produces an effect of allowing a traffic amount based on an assumption that a new user plane function is added, to be confirmed through actual measurement.

Furthermore, in the first aspect, it may be determined that the new user plane function should be added, in a case where a delay time measured for a virtual machine in a subnet belonging to the new user plane function is less than a predetermined delay threshold, the delay time being measured at an entity located on the local area network. This produces an effect of allowing a delay time based on an assumption that a new user plane function is added, to be confirmed through actual measurement.

Moreover, in the first aspect, whether or not to delete a target user plane function may be determined in consideration of a processing usage rate of the target user plane function and processing usage rates of other user plane functions than the target user plane function, the target user plane function being among the at least one user plane function. This produces an effect of determining whether or not to delete a user plane function by using processing usage rates of user plane functions.

Furthermore, in the first aspect, it may be determined that the target user plane function should be deleted, in a case where the processing usage rate of the target user plane function among the at least one user plane function falls below a first threshold, and a processing usage rate of at least one of the other user plane functions than the target user plane function falls below a second threshold that is higher than the first threshold. This produces an effect of determining that a target user plane function with a low processing usage rate should be deleted, in a case where another user plane function can accommodate a portion that has been processed by the target user plane function.

Furthermore, in the first aspect, it may be determined that the target user plane function should be deleted, in a case where traffic amounts measured for virtual machines in subnets belonging to the other user plane functions exceed an assumed amount of traffic of the target user plane function, the traffic amounts being measured at an entity located on the local area network. This produces an effect of allowing a traffic amount based on an assumption that the target user plane function is deleted, to be confirmed through actual measurement.

BRIEF DESCRIPTION OF DRAWINGS

FIG. 10 is a diagram showing an example of measuring a maximum amount of traffic on a communication channel for each UPF 120 in the embodiment of the present technology.

FIG. 13 is a diagram showing an example of measuring the amount of traffic of user data for each UPF 120 in operation in the embodiment of the present technology.

MODE FOR CARRYING OUT THE INVENTION

Modes for carrying out the present technology (hereinafter referred to as embodiments) will be described below. Descriptions will be provided in the following order.
 1. First embodiment (example of control focused on the amount of traffic on a LAN)
 2. Second embodiment (example of control to be performed also in consideration of the amounts of traffic on other communication channels)

1. First Embodiment

[Wireless Communication System]

Figure 1:
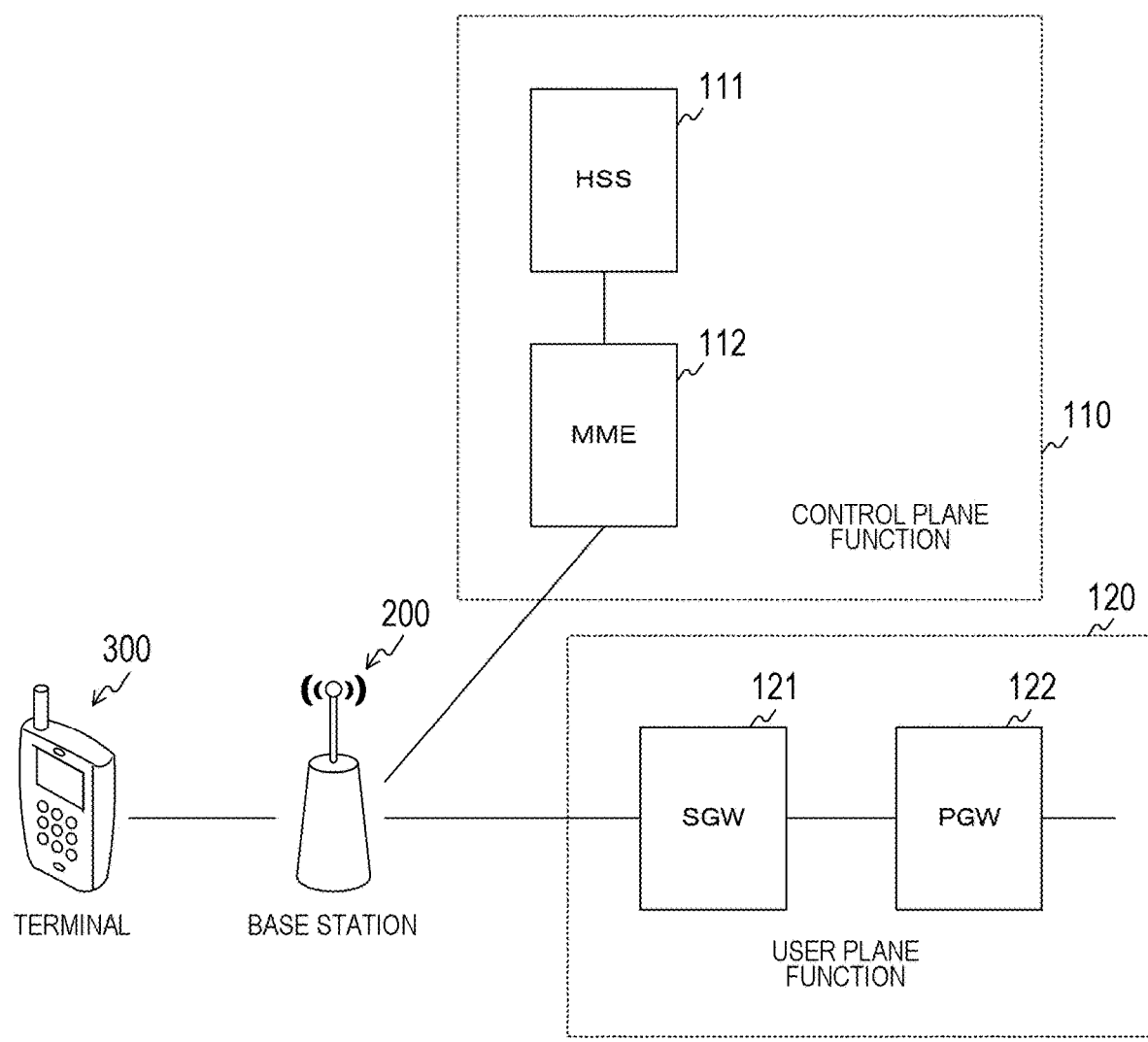
FIG. 1 is a diagram showing a first example of a wireless communication system assumed in an embodiment of the present technology.

FIG. 1 is a diagram showing a first example of a wireless communication system assumed in an embodiment of the present technology.

The first example is an example of a case where an embodiment of the present technology is applied to a fourth generation mobile communication system (4G). A terminal 300 is connected to a core network via a base station 200. The terminal 300 and the base station 200 are connected by a RAN which is a wireless system.

The core network mainly gives the terminal 300 permission to connect to a network, and performs session management. In 4G, the core network is referred to as an evolved packet core (EPC). The 4G core network is divided into a control plane function 110 and a user plane function 120. The former controls the network, and the latter performs packet transfer. Note that the control plane function 110 is an example of a control unit described in the claims. Furthermore, hereinafter, the control plane function 110 may be simply abbreviated as a control plane. Similarly, the user plane function 120 may be simply abbreviated as a user plane.

The control plane function 110 for 4G includes an HSS 111, an MME 112, and the like. The home subscriber server (HSS) 111 is a database server that manages user information. The mobility management entity (MME) 112 is a gateway for a control signal for controlling the terminal 300.

The user plane function 120 for 4G includes an SGW 121, a PGW 122, and the like. The serving gateway (SGW) 121 is a gateway for user data. The packet data network gateway (PGW) 122 is a gateway for connecting to an external network.

In 4G, information on a contract for the terminal 300 and an encryption key are received from the HSS 111 in which information on subscriber of the terminal 300 is stored. Then, it is determined whether or not the terminal 300 may connect to the network, and generation of an encryption key, and the like are performed. That is, information on the terminal 300 associated with a subscriber number called international mobile subscriber identity (IMSI) in a subscriber identity module (SIM) card in the terminal 300 needs to be stored in the HSS 111 so as to allow the terminal 300 to connect to the network. In addition, the MME 112 plays a role in attaching the terminal 300 to the cellular system.

Figure 2:
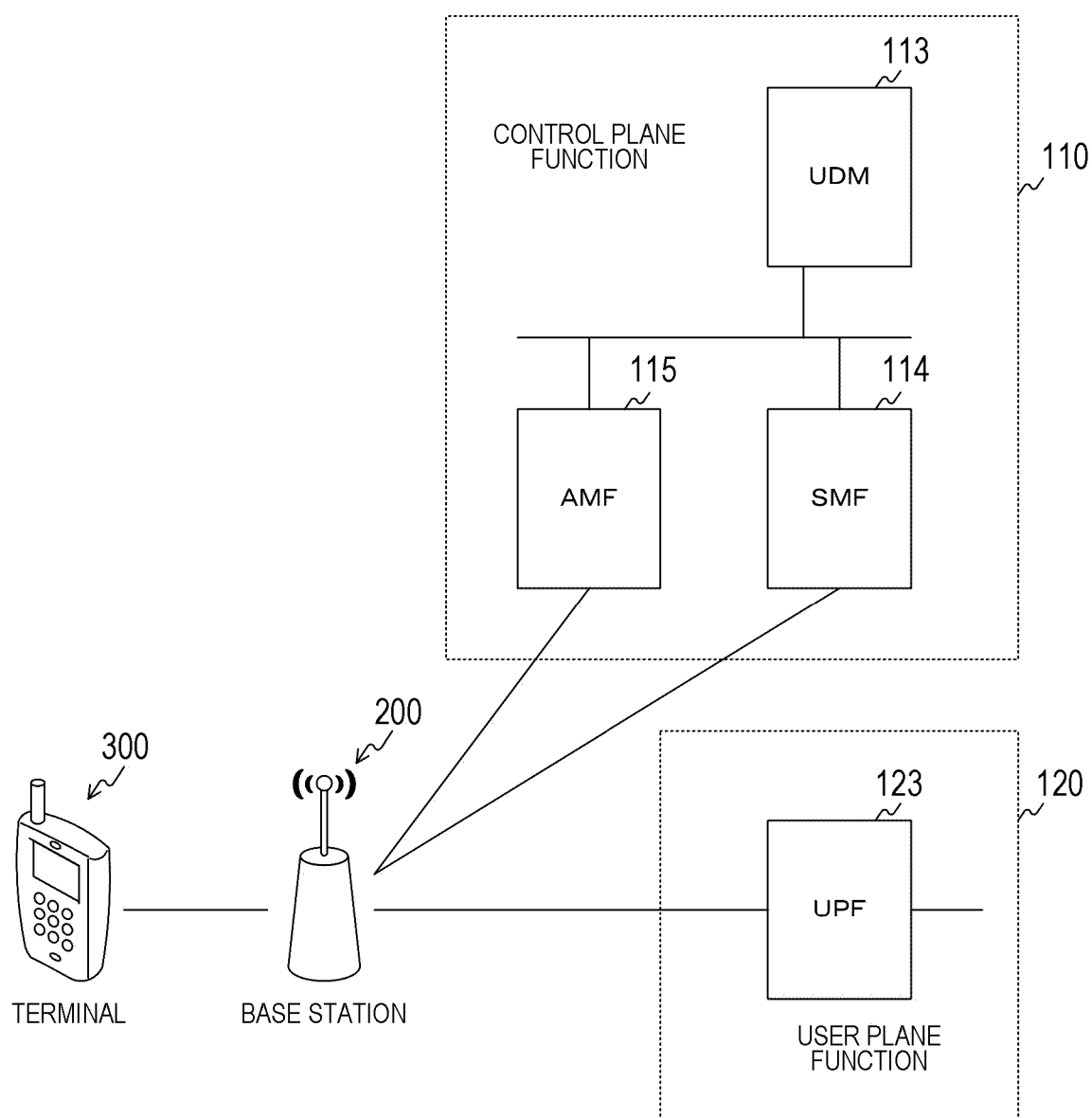
FIG. 2 is a diagram showing a second example of the wireless communication system assumed in the embodiment of the present technology.

FIG. 2 is a diagram showing a second example of the wireless communication system assumed in the embodiment of the present technology.

The second example is an example of a case where the embodiment of the present technology is applied to a fifth generation mobile communication system (5G). The terminal 300 is connected to a core network via the base station 200, and the terminal 300 and the base station 200 are connected by a RAN. The second example is similar to the above-described case of 4G in this respect.

The control plane function 110 for 5G includes a UDM 113, an SMF 114, an AMF 115, and the like. The unified data management (UDM) 113 manages subscriber information. The session management function (SMF) 114 performs session management. The access and mobility management function (AMF) 115 performs authentication, position management, and the like of the terminal.

The user plane function 120 for 5G is not divided into any separate sections such as the SGW 121 and PGW 122 for 4G, and is represented as a user plane function (UPF) 123 here.

In 5G, the UDM 113 has a function similar to the function of the above-described HSS 111. Hereinafter, the notation "HSS 111" is used, but this can also be applied to the UDM 113. In addition, the AMF 115 and the SMF 114 play their roles in attaching the terminal 300 to the cellular system.

Figure 3:
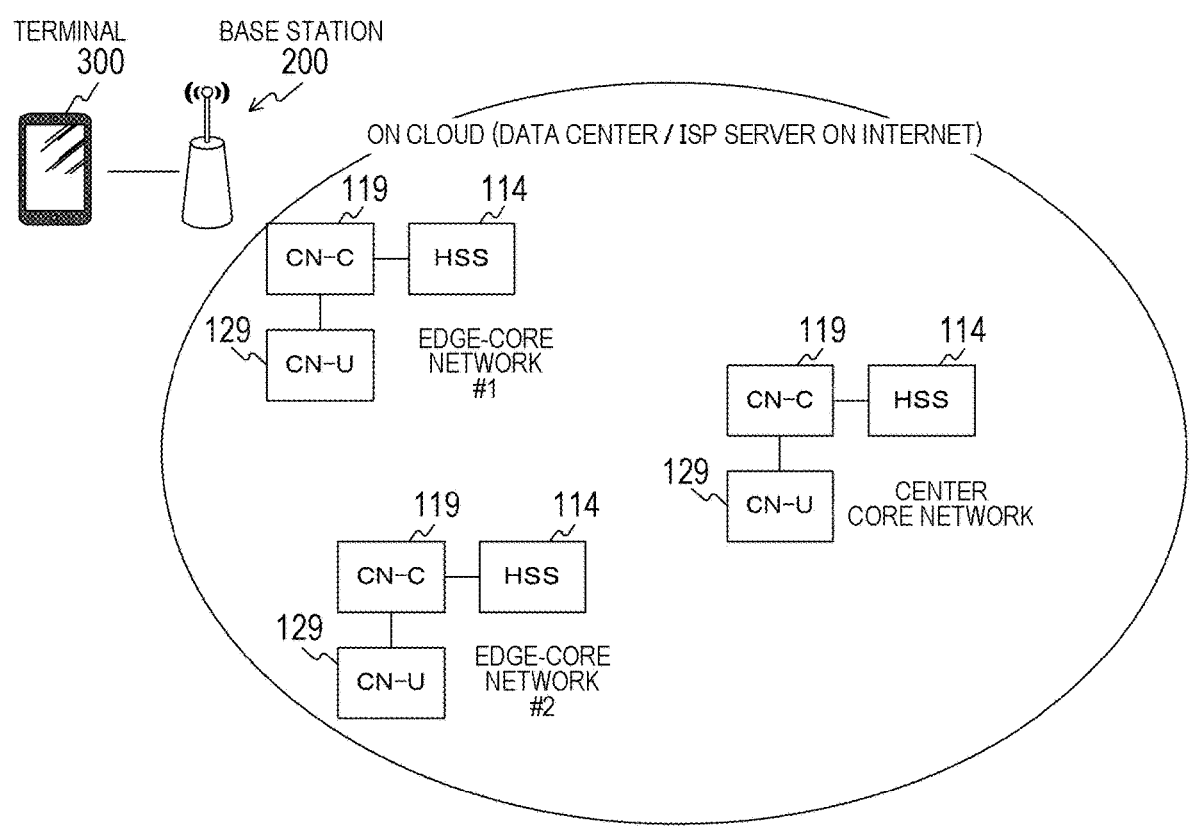
FIG. 3 is a diagram showing an arrangement example of a core network in the embodiment of the present technology.

FIG. 3 is a diagram showing an arrangement example of a core network in the embodiment of the present technology.

The PGW 122 for 4G and the UPF 123 for 5G each play the role of a gateway serving as a boundary between the core network and the general Internet. This embodiment is based on the assumption that the core network is also located on the general Internet. Therefore, a core-network user plane function called a CN-U 129 corresponding to the PGW 122 or the UPF 123 may be regarded as a gateway located at a boundary between the core network and a general application. Similarly, here, components corresponding to the MME 112, the SMF 114, and the AMF 115 are each represented as a CN-C 119.

It is known that when a core network is located near the terminal 300 and the base station 200, a delay to be caused in a cellular part is reduced. Therefore, it is expected that the number of core networks located at the edge of the Internet will increase. However, also in this case, it is useful to locate, as a center core network, a core network not located at the edge. This is because the center core network just needs to be used when no core network is located at the edge. Note that the expression "core network located at the edge" may be replaced with the expression "one or more core network nodes located at the edge in the core network". Furthermore, the term "edge" may refer to being located near the terminal 300 or the base station 200 (for example, an access point of the terminal 300).

In the future, it is expected that under the situation where there is a center core network, a large number of core networks will be located at the edges of the Internet in various places in the world. It is conceivable that a core network may be located on a LAN in a factory, a hospital, or an office in some cases. At least, it is conceivable that the base station 200 is located in a local area such as a factory, a hospital, or an office, and the core network may be located in such a local area in some cases, or may be located on the Internet near the local area in other cases. In any case, a low-cost system is required in such a local cellular system. These may also be referred to as private 4G (local 4G), private LTE (local LTE), private 5G (local 5G), or the like.

[Throughput]

The user plane function to be implemented by the SGW 121 and the PGW 122 or the UPF 123 has, as an index of its capability, a maximum throughput that can be processed. For example, this refers to an index indicating that user data (user plane data) of 100 Mbps can be processed or the like. Assume that there is a core-network user plane function with a processing capacity of 100 Mbps, and the processing capacity of a single base station 200 is 100 Mbps. In this case, when a single terminal uses the network, the single terminal can enjoy a speed of 100 Mbps. Meanwhile, in a case where there are 10 sets of the base station 200 and a terminal like that, the capability of the core-network user plane becomes a bottleneck, so that each terminal can obtain only a throughput of 10 Mbps.

Figure 4:
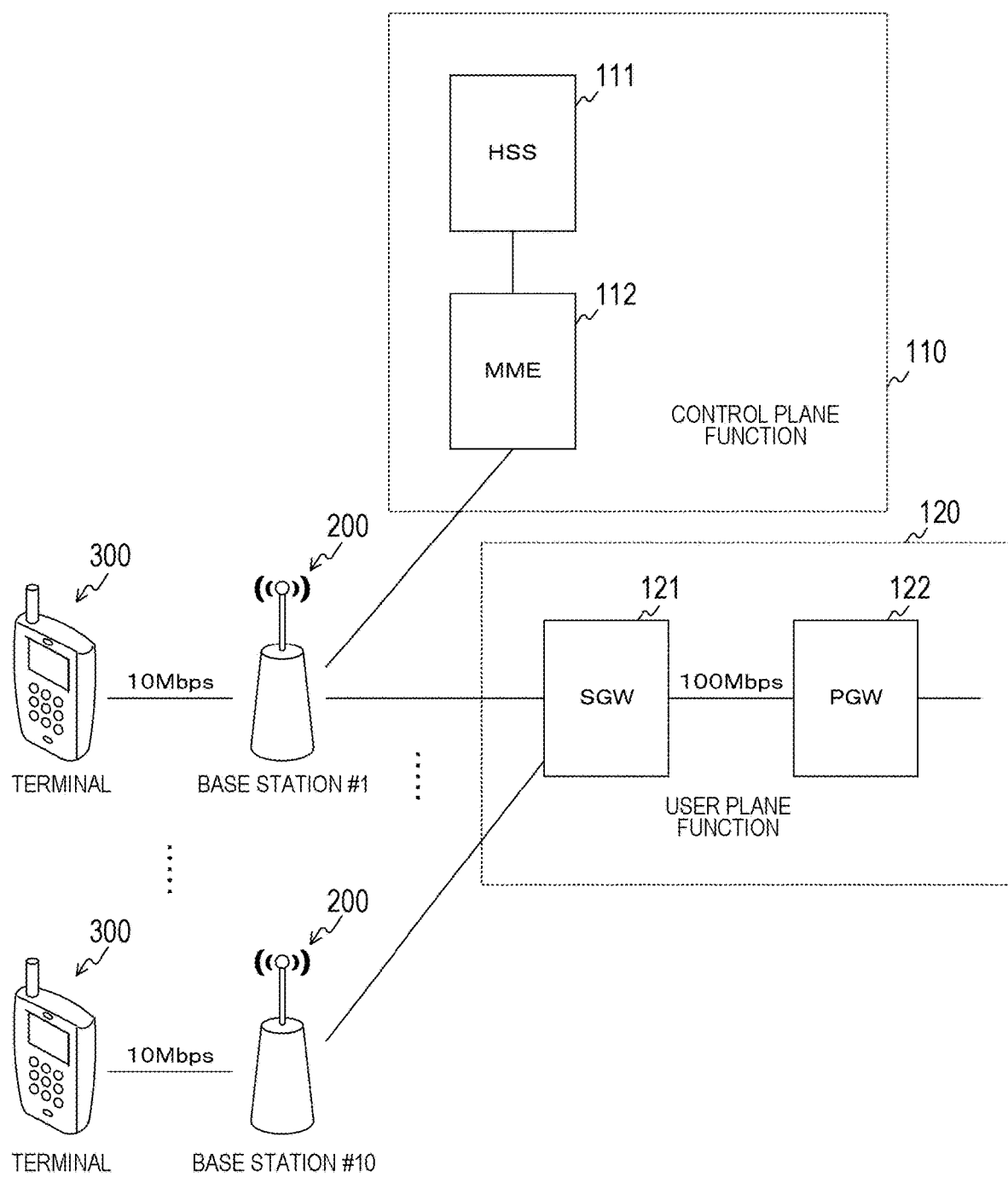
FIG. 4 is a diagram showing an example of a case where the core network is a bottleneck.

FIG. 4 is a diagram showing an example of a case where the core network is a bottleneck. There is a possibility that when the number of the terminals 300 and the number of the base stations 200 increase for the core-network user plane function with a processing capacity of 100 Mbps, the capability of the user plane may become a bottleneck. When the number of the base stations 200 and the number of the terminals 300 increase in this manner, it is necessary to improve the capability of the core-network user plane.

When the capability of the core-network user plane is improved, that is, scaling is performed, there are static scaling and dynamic scaling as conceivable scaling. The static scaling is a method in which once the number of user planes is determined, the number of user planes is basically not changed after the core network is activated and connected to the base station 200 to start operation. Meanwhile, dynamic scaling is a method of flexibly increasing or decreasing the number of user planes in response to a change in the number of the terminals 300.

A method of dynamically increasing or decreasing the number of user planes is very difficult. This is because there may be a case where it is necessary to change the setting of the base station 200, and there may be a case where the function of allocating a new PDU session to the user plane function may involve time and effort to, for example, notice the presence of a changed user plane and update an internal table. Since a core network for the above-described local cellular system referred to as private LTE, private 5G, or the like needs to be created at low cost, it has been difficult to take such trouble. At the time of this scaling, whether the number of user plane functions should be increased or decreased needs to be determined by some function in either case of a dynamic method or static method.

In this embodiment, the terminal 300 and the base station 200 are located on a local area network (LAN). Furthermore, in this embodiment, a core-network control plane is located on a cloud on the Internet. Meanwhile, the core-network user plane function may be located on an on-premises LAN or may be located on the cloud.

The number of user plane functions to be located on the LAN cannot be increased unless installations such as a personal computer (PC) are enhanced. Meanwhile, it is possible to easily add a user plane function to be located on the cloud by adding a virtual machine on the cloud and activating a program of the user plane function in the virtual machine. In order to delete the user plane function, the virtual machine just needs to be deleted after the program of the user plane function is stopped. Therefore, addition or deletion of user plane functions is mainly performed by addition or deletion of user plane functions located on the cloud.

It is relatively easy to add or delete user plane functions on the cloud. It is also possible to locate a user plane function on the LAN and to add or delete a user plane function. However, it is difficult to add or delete a user plane function on the LAN because it is not possible to freely add or delete a virtual machine. Note that, in a case where user plane functions are viewed from the terminal 300, a user plane function of the LAN and a user plane function of the cloud appear in parallel in the same manner, and thus a difference therebetween cannot be seen.

Therefore, a method for adding or deleting a user plane function on the cloud will be examined below.

Figure 5:
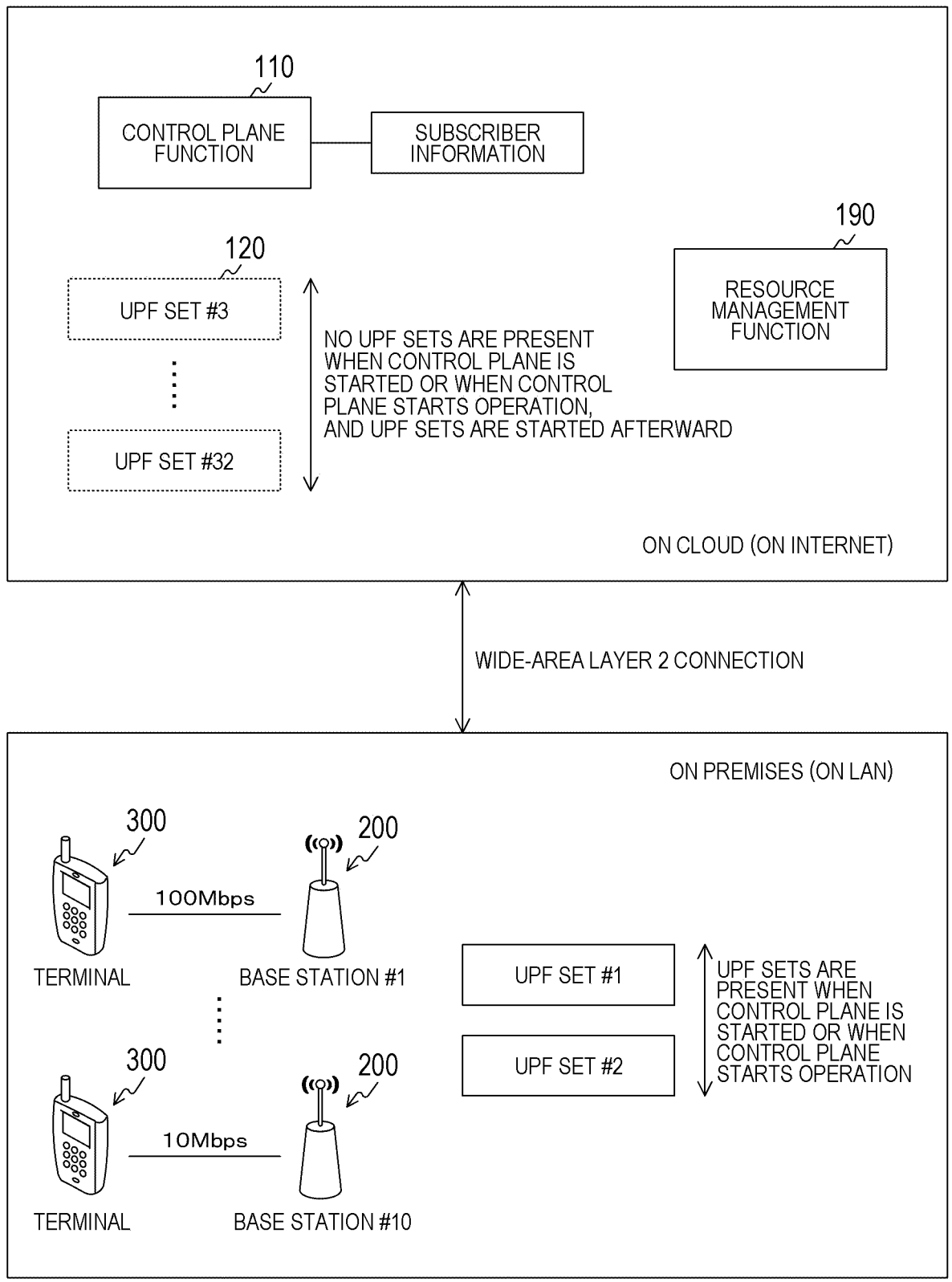
FIG. 5 is a diagram showing an example of the wireless communication system in the embodiment of the present technology.

FIG. 5 is a diagram showing an example of the wireless communication system in the embodiment of the present technology.

In this example, the wireless communication system is formed across the premises and the cloud, as described above. Locating a UPF on the premises refers to locating the UPF on a LAN of a factory, a hospital, an office, or the like. Locating a UPF on the cloud refers to locating the UPF in a data center of the cloud on the Internet. The base station 200 and the terminal 300 are originally installed in a local area.

The core-network control plane may be installed on the premises or on the cloud. An example in which the control plane is installed on the cloud is shown here.

This example is based on the assumption that two user plane functions are present on the premises when the control plane is started or when the control plane starts operation. In addition, it is assumed that no user plane functions are present on the cloud when the control plane is started or when the control plane starts operation, and user plane functions are started afterward.

It is desirable to form a network as the same subnet in data centers of the LAN and the cloud, by a wide-area Layer 2 connection. This makes it possible to increase or decrease the number of user plane functions regardless of whether the user plane functions are on the LAN or the cloud. When an on-premises user plane function becomes insufficient, an on-cloud user plane function can be actually activated to increase the total capacity of the user plane functions. Note that an existing technique such as a virtual private network (VPN) can be applied as a technique for wide-area Layer 2 connection.

Here, the subnet refers to a range in which routing can be performed on the basis of a MAC address when an IP packet is transferred. Specifically, entities that connect to the same switch are described as belonging to the same subnet. Basically, a single UPF belongs to a single subnet. Therefore, in a case where there are 32 UPFs, 32 different subnets are present on the cloud.

A resource management function 190 on the cloud manages resources on the network. Here, in particular, the resource management function 190 has a function of adding or deleting a user plane function on the cloud on the basis of the state of the network.

Conventionally, there is known a method for measuring an achieved speed (Mbps) by using a network traffic amount measurement tool that is a tool such as iperf3 or ping, for a user plane function to be measured in use. In this method, measurement is performed with an iperf3 server located in a user plane function or in a virtual machine in the vicinity of the user plane function, and an iperf3 client located on the LAN side. This makes it possible to measure the degree of congestion of traffic on a communication channel of a communication path to the user plane function. Note that throughput is synonymous with a traffic amount, but traffic is not synonymous with throughput. Throughput is synonymous with the amount of traffic passing through a single function. In the following embodiment, throughput and a traffic amount are used in the same sense.

Even if this information is acquired, it is not possible to find a communication path where traffic is congested. Thus, this information is not sufficient as information for determining whether to add or delete the user plane function. In addition, the network measurement tool measures room for improvement of the amount of traffic by actually generating traffic. However, the traffic generated by the network traffic amount measurement tool may affect communication of important user data, leading to a decrease in the amount of traffic of the user data and deterioration of delay characteristics. In particular, since a LAN portion of the private 5G/4G is often a fragile network, it is not desirable for the network traffic amount measurement tool to actually transmit test data in such a network.

Therefore, in this embodiment, information that the resource management function 190 focuses on is roughly divided into the following two pieces of information. The first is the processing capacity of a user plane function. In addition, the second is the state of traffic flowing through the network. Traffic flowing through the network is divided into two types of communication channel, that is, a communication channel common to the user plane functions and a communication channel unique to each user plane function. The former is mainly a LAN communication path, and the latter is mainly a communication path that differs between the user plane functions on the cloud.

First, the processing capacity of the first user plane function will be examined. The user plane function is designed as software. In a case where the processing capacity of the software is, for example, 100 Mbps, it is possible to process user data of 100 megabits per second. At this time, in a case where user data are used at a capacity of 80 Mbps, which is close to 100 Mbps, it is desirable to add another user plane function and cause the added user plane function to perform processing together with other user plane functions because processing capacity increases. Of course, in a case where the number of user plane functions is increased, a cloud virtual machine is added. This also cause, as a negative impact, cost increases for the private 5G/4G network operators.

Next, the second point, that is, the state of traffic flowing through the network will be examined. Even if it is determined that it is better to add a user plane function from the first viewpoint, that is, a viewpoint of the processing capacity of the user plane function, it is conceivable that throughput performance will not be improved by an increase in the number of user plane functions in a situation where network traffic is congested. Therefore, it is important to grasp the state of network traffic. Here, the state of network traffic is roughly divided into two. One is the congestion status of network traffic on the LAN side, and the other is the congestion status of network traffic on the cloud side.

User plane functions located on the cloud side use a common LAN. Network traffic also passes through the same path on the Internet at the subsequent stage, and passes through different communication channels when divided into each user plane function at the end. That is, the communication path is divided into a common communication path and a communication path unique to each user plane function. Then, it can be said that the common communication path is greatly affected by the LAN.

Figure 6:
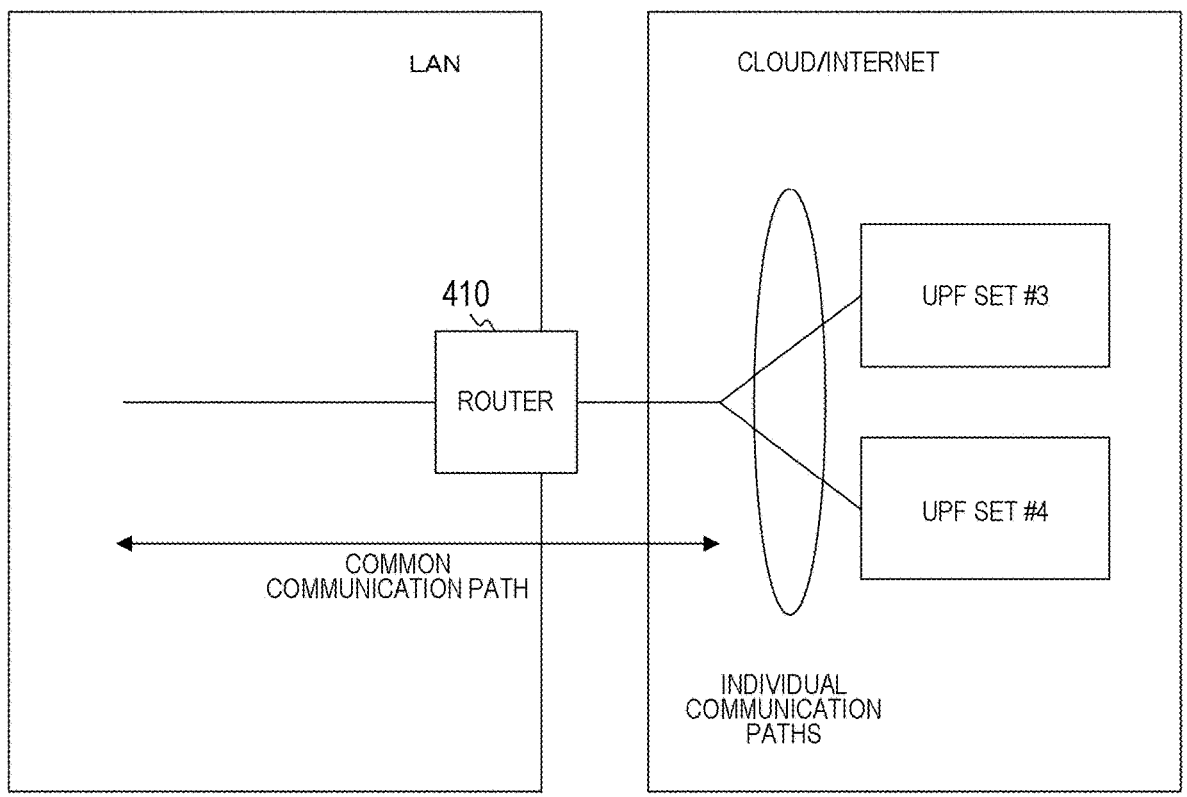
FIG. 6 is a diagram showing an example of communication paths of the wireless communication system in the embodiment of the present technology.

FIG. 6 is a diagram showing an example of communication paths of the wireless communication system in the embodiment of the present technology.

In this example, it is assumed that a connection to the Internet is established from a LAN through the common communication path with a router 410 as a gateway.

Here, the common communication path will be examined. There may be a case where a branch is caused in the router 410 located at a boundary between the LAN and the Internet services provider (ISP) that provides the Internet to the LAN. In addition, there may be a case where the communication path of the ISP at a stage subsequent to the LAN is branched into individual communication paths. Furthermore, there may be a case where the communication path is branched into individual communication paths in a data center of the cloud at a stage subsequent thereto. In any case, all the traffic that has reached each user plane function on the cloud side has passed through the common communication path.

In a case where the traffic of a specific user plane function is congested, but the LAN that is a common communication path is not congested, adding a user plane function in another place and using the user plane function there will improve throughput performance. Furthermore, in a case where it is desired to add one user plane function, it is necessary to determine whether traffic for the added user plane function can be absorbed by at least the LAN that is a common portion. On the basis of the determination, it is better to determine whether the traffic can also be absorbed by individual communication paths. As described above, when observing the traffic of the private 5G/4G, it is important to determine whether the common communication path is congested or an individual communication path is congested.

A LAN is used in the private 5G/4G. Therefore, in a case where the LAN is a fragile network, there may be a case where the processing capacity of the router 410 serving as a gateway for data going out to the Internet from the LAN is limited, or may be a case where the capability of the communication channel of the ISP is limited. Therefore, it is not desirable to use a method of generating test traffic by using a network tool such as iperf3 to know room for improvement of the speed of the network. This is because there is a possibility that the method may reduce throughput of important existing user data or degrade delay characteristics. Furthermore, in the case of measuring a throughput between a client of a network tool located on a LAN and a user plane function located on the cloud or a server of a network tool located in a virtual machine in the vicinity thereof, it has been difficult to determine whether the common communication path is congested or an individual communication path is congested. In this embodiment, addition or deletion of a user plane function is determined to flexibly control the number of user plane functions under such an environment.

[Outline of Processing]

Figure 7:
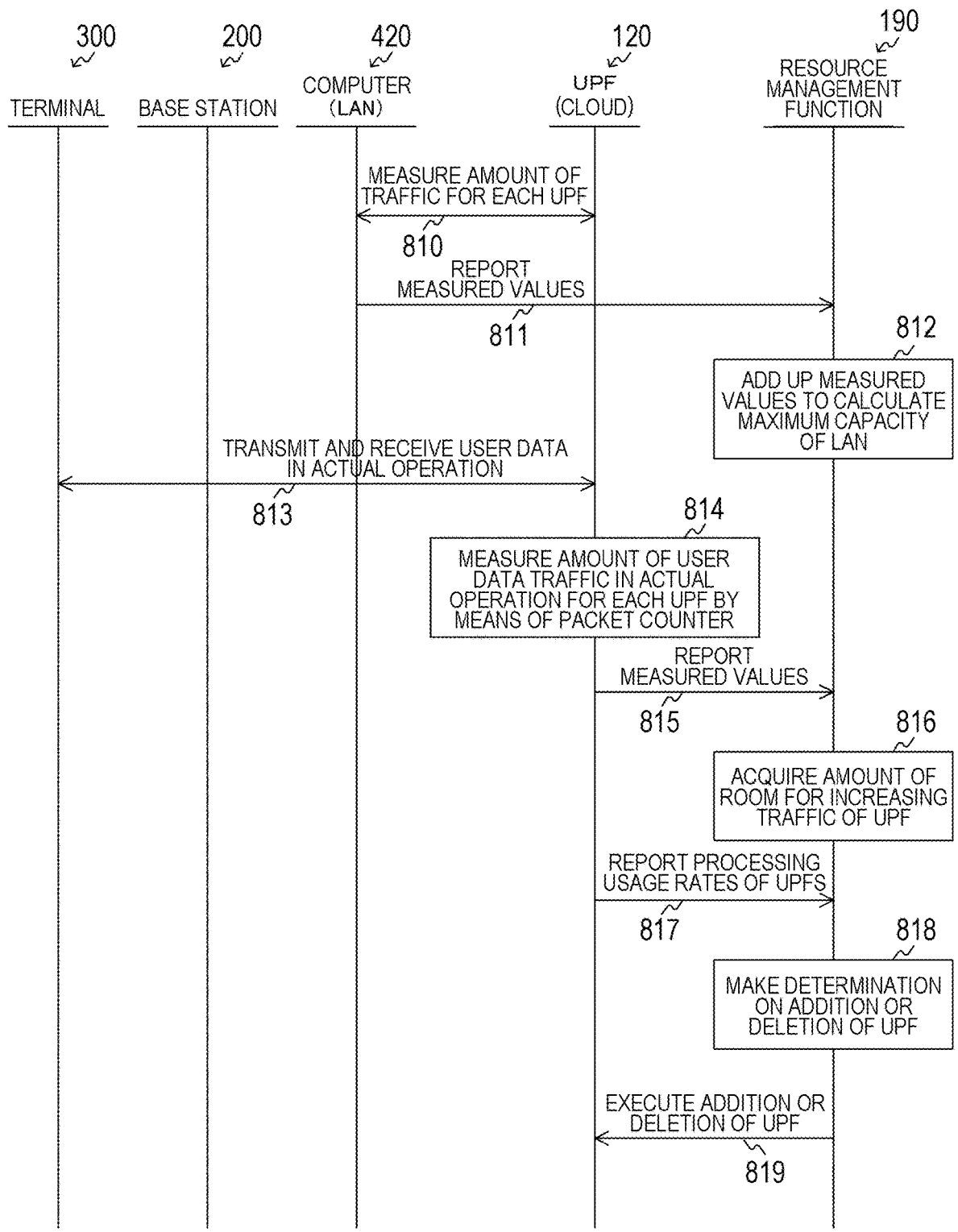
FIG. 7 is a sequence diagram showing an exemplary overall processing procedure of the wireless communication system in a first embodiment of the present technology.

FIG. 7 is a sequence diagram showing an exemplary overall processing procedure of the wireless communication system in a first embodiment of the present technology.

First, the maximum amount of traffic on the LAN is acquired. Therefore, as will be described later, a computer (PC) 420 is located on the LAN, and the maximum amount of traffic on a communication channel is measured for each UPF 120 by use of a network traffic amount measurement tool (810). Note, however, that this is performed at night or the like when the private 5G/4G is not in operation.

The computer 420 reports the maximum amount of traffic measured for each UPF 120 to the resource management function 190 (811). The resource management function 190 calculates the maximum capacity of the LAN on the basis of the adding up of the maximum amount of traffic for each UPF 120 (812). As will be described later, the maximum capacity of the LAN is obtained by selection of the largest value of traffic amounts for virtual machines that execute programs for the UPFs 120 located on the cloud.

Next, acquired for each UPF 120 is the amount of user data traffic flowing when actual operation (813) is performed between the terminal 300 and the UPFs 120 via the base station 200. Therefore, as will be described later, a packet counter 180 is assumed for each UPF 120, and the amount of user data traffic in actual operation is measured by the packet counter 180 (814). Values measured by the packet counter 180 are reported to the resource management function 190 (815).

The resource management function 190 sums up the measured amounts of user data traffic in actual operation to calculate the amount of user data traffic on the LAN. Then, the amount of room for increasing traffic of the UPF 120 is acquired by subtraction of the amount of user data traffic on the LAN from the maximum capacity of the LAN described above (816). The amount of room for increasing traffic is the amount of traffic available when the number of the UPFs 120 is increased as will be described later.

Next, the UPFs 120 calculate their respective processing usage rates, and report the processing usage rates to the resource management function 190 (817). As will be described later, this processing usage rate indicates remaining capacity of processing of a program implementing the UPF 120.

With reference to the various types of information acquired in this manner, the resource management function 190 determines whether or not to newly add the UPF 120 and whether or not to delete the existing UPF 120 (818). Details of this determination will be described later. Then, on the basis of the determination, the resource management function 190 executes addition or deletion of the UPF 120 (819).

[Acquisition of Maximum Amount of Traffic on LAN]

Figure 8:
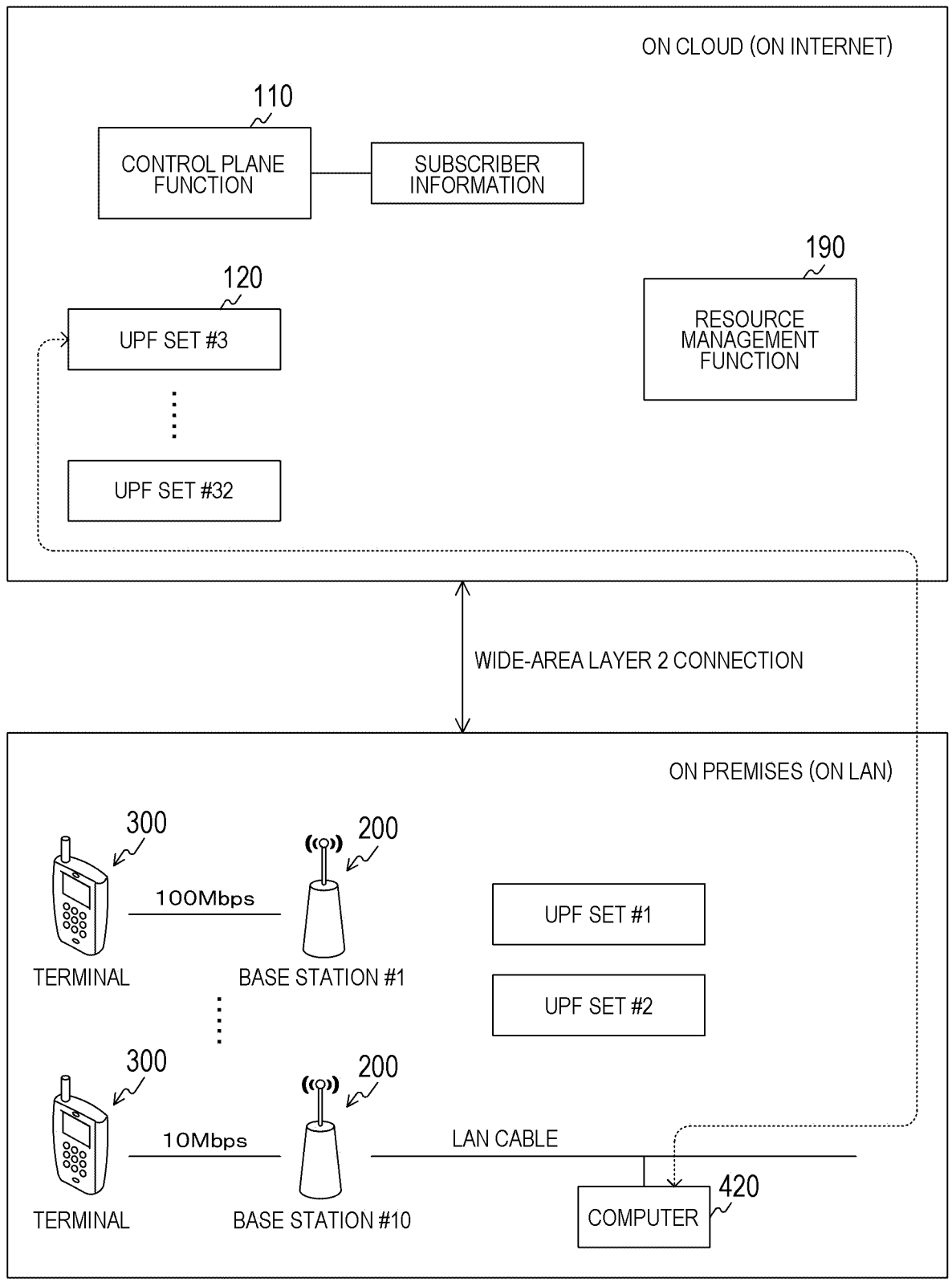
FIG. 8 is a diagram showing an exemplary mode of acquisition of a maximum amount of traffic on a LAN in the embodiment of the present technology.

FIG. 8 is a diagram showing an exemplary mode of acquisition of the maximum amount of traffic on the LAN in the embodiment of the present technology. The acquisition of the maximum amount of traffic on the LAN corresponds to 810 to 812 above.

At night or the like when the private 5G/4G is not in operation, the maximum amount of traffic on a communication channel is measured at the computer 420 located on the LAN for each UPF 120 by use of a network traffic amount measurement tool such as iperf3. The traffic amount measurement here is not traffic amount measurement using the capability of the core network, but is measurement of the amount of traffic on a communication path of a fixed cable to be performed by the computer 420 connected to the LAN via an Ethernet cable, for the UPF 120 located on the cloud. This measurement is performed multiple times during a time period in which it is assumed that the network is not congested, so that the maximum amount of traffic can be estimated. Note that the computer 420 is an example of an entity located on the LAN.

Figure 9:
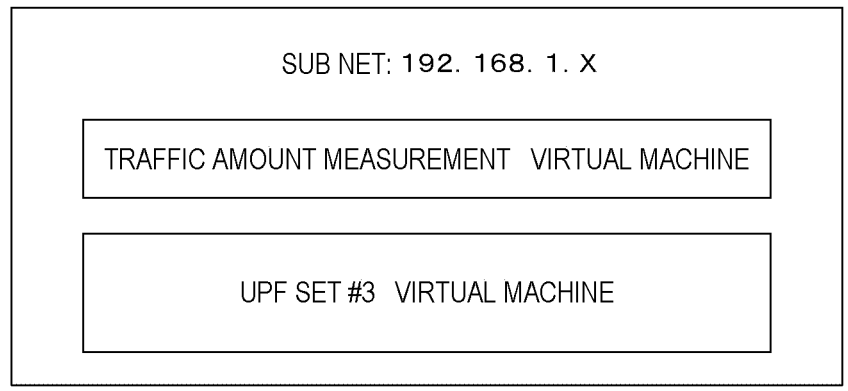
FIG. 9 is a diagram showing an example of operation being performed by UPFs when the maximum amount of traffic on the LAN is acquired in the embodiment of the present technology.
Figure 9:
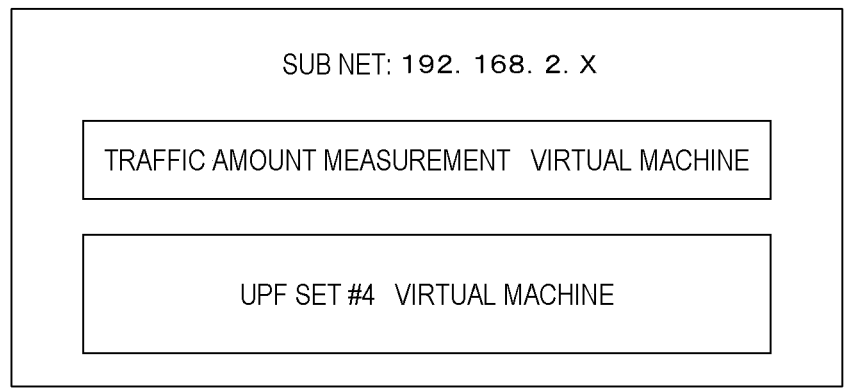
Figure 9:
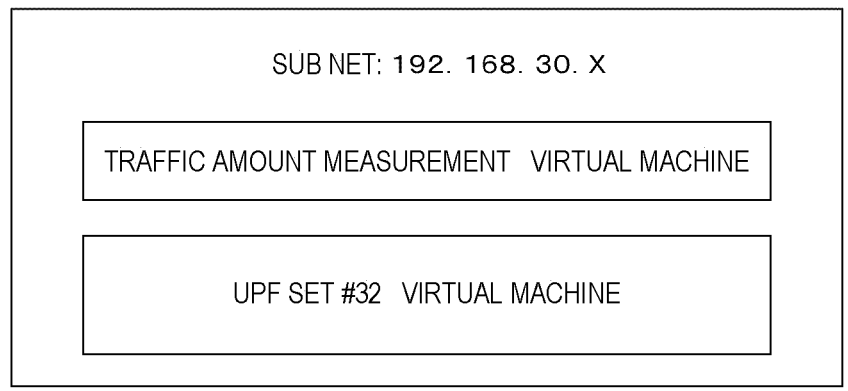

FIG. 9 is a diagram showing an example of operation being performed by UPFs when the maximum amount of traffic on the LAN is acquired in the embodiment of the present technology.

The UPFs 120 are located on different subnets. Then, in a case where measurement is performed by means of the network traffic amount measurement tool at the computer 420 located on the LAN side, an amount of traffic may be measured for a virtual machine located on each subnet, or may be measured for a virtual machine in which the UPF 120 is located. That is, measurement may be performed for any of virtual machines as long as the virtual machines are on the same subnet. Thus, measurement just needs to be performed for any virtual machine located on the subnet.

FIG. 10 is a diagram showing an example of measuring the maximum amount of traffic on a communication channel for each UPF 120 in the embodiment of the present technology.

The amount of traffic to a subnet to which each UPF 120 belongs is shown here. That is, FIG. 10 shows the amount of traffic only in a wired communication section, and the amount of traffic in a wireless section is not shown in FIG. 10. It is assumed that, in this case, the amount of traffic for uplink is basically equal to the amount of traffic for downlink. Therefore, it is considered that the amount of traffic for either uplink or downlink just needs to be measured.

Here, a largest value of the respective maximum amounts of traffic of 32 UPFs 120 is regarded as the maximum capacity of the communication path from the LAN to the cloud. The maximum capacity refers to a maximum amount of traffic flowing in point-to-point communication. In this example, it is estimated that the maximum speed of communication from the LAN to the Internet is 1.5 Gbps.

That is, the maximum capacity of the LAN is obtained by the following equation. Note that a function Max is a function representing a largest value.

Maximum Capacity of LAN=Max(Maximum Amount of Traffic of UPF #1,

Maximum Amount of Traffic of UPF #2, . . . ,

Maximum Amount of Traffic of UPF #32)

The configuration example of the wireless communication system described above is based on the assumption that the UPFs #1 and #2 are located on the LAN and the UPFs #3 to 32 are located on the cloud. Therefore, in this case, in order to determine whether or not it is possible to newly add the UPF 20 to the cloud, the maximum amounts of traffic for virtual machines that implement the UPFs 120 located on the cloud are regarded as the maximum capacity of the LAN as in the following equation.

Maximum Capacity of LAN=Max(Maximum Amount of Traffic of UPF ∩3,

Maximum Amount of Traffic of UPF #4, . . . ,

Maximum Amount of Traffic of UPF #32)

Note that the maximum amount of traffic of the UPF in the above equation is not a traffic amount measured during normal UPF processing being performed as described above, but a traffic amount measured by the network measurement tool with respect to the virtual machines in which the programs for the UPFs 120 are located.

[Acquisition of Amount of Traffic of User Data for Each UPF]

Figure 11:
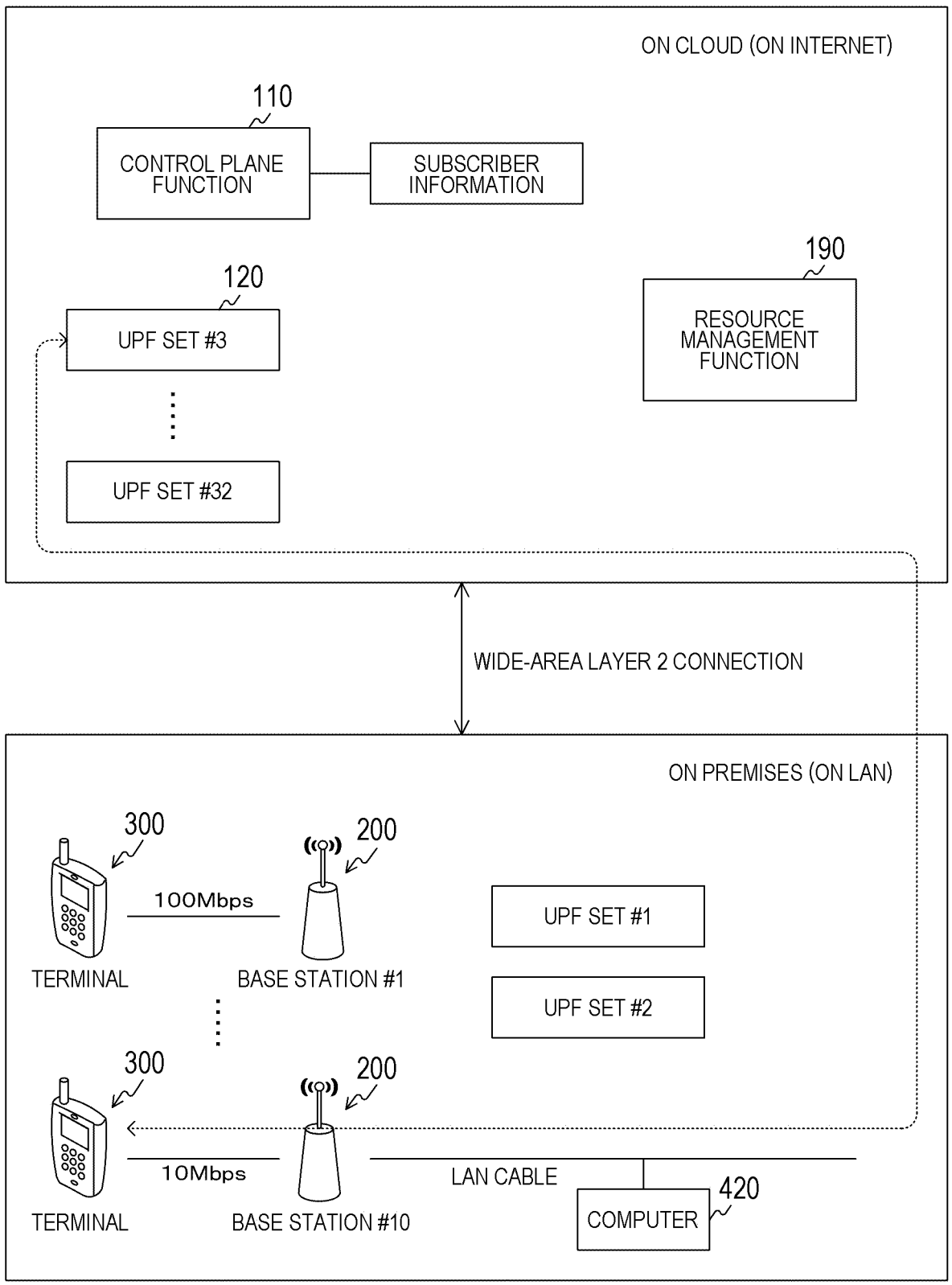
FIG. 11 is a diagram showing an exemplary mode of acquiring the amount of traffic of user data for each UPF 120 in the embodiment of the present technology.

FIG. 11 is a diagram showing an exemplary mode of acquiring the amount of traffic of user data for each UPF 120 in the embodiment of the present technology. The acquisition of the amount of traffic of user data corresponds to 813 to 815 above.

In the UPF 120 installed on the cloud, it is possible to construct a different subnet for each UPF 120, so that it can be said that all traffic flowing into a subnet is traffic of the UPF 120 corresponding to the subnet. Therefore, the amount of traffic of user data can be easily obtained by measurement of the amount of 5G/4G traffic flowing to a target UPF among the UPFs 120 installed on the cloud. In particular, subnets are provided separately for the UPFs 120, and the number of packets flowing into the subnet is measured to obtain the amount of traffic. As a result, there is an advantage that it is not necessary to measure the amount of traffic actually received or transmitted in the UPF 120. Therefore, it is possible to measure the amount of traffic to the UPF located for each subnet by monitoring traffic flowing into the subnet and traffic flowing from the subnet.

Meanwhile, since various other flows of traffic exist on a subnet to which the UPF 120 constructed on the premises (LAN) belongs, it is difficult to separate traffic being used in the private 5G/4G from other traffic. Therefore, only traffic flowing into a subnet to which the UPF 120 on the cloud belongs is monitored on purpose in the wireless communication system of this embodiment. Monitoring only the traffic of the UPF 120 on the cloud allows the amount of traffic being used by a specific UPF 120 on the cloud to be clarified.

Figure 12:
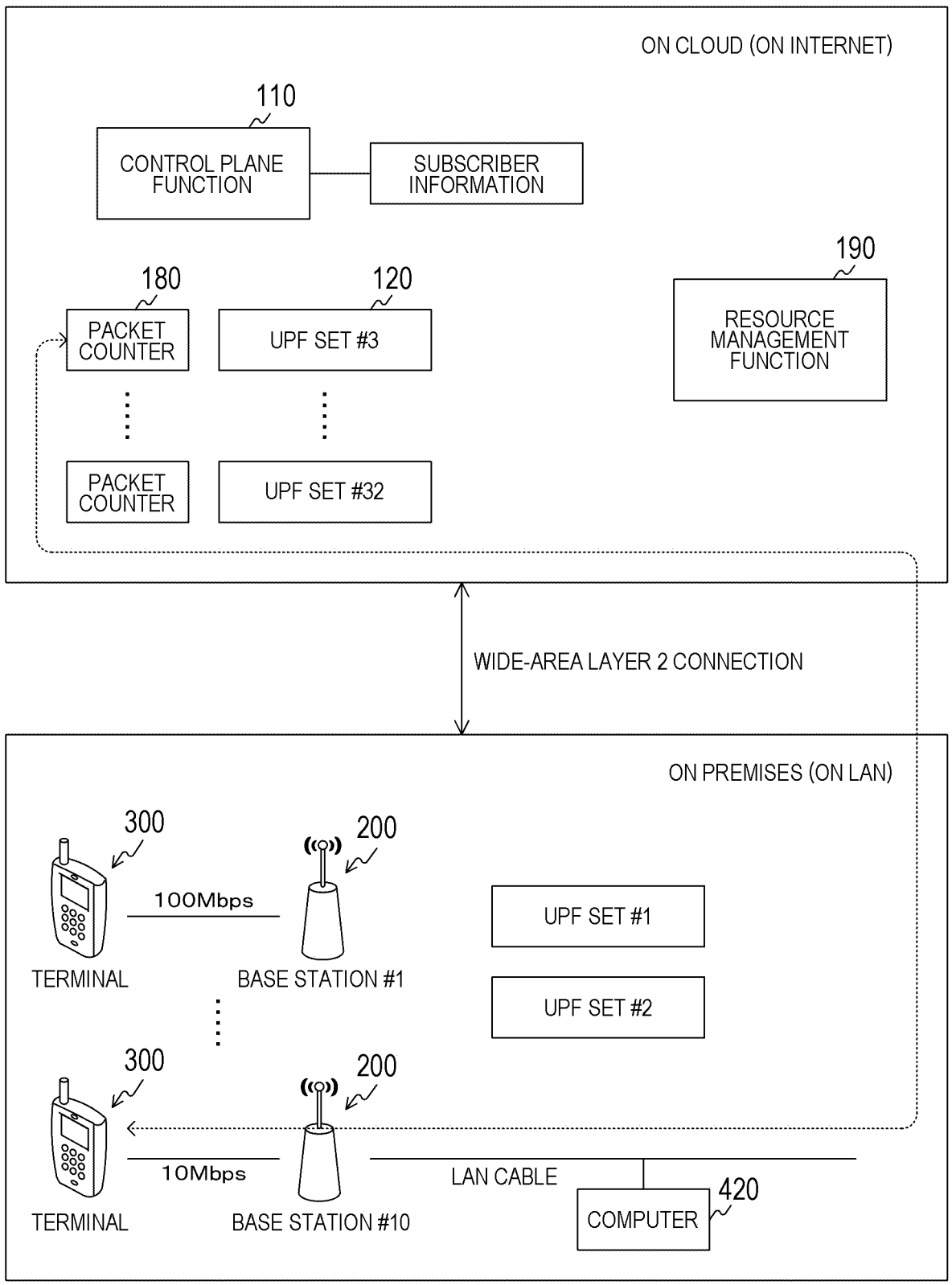
FIG. 12 is a diagram showing an example of applying a packet counter 180 at the time of acquiring the amount of traffic of user data for each UPF 120 in the embodiment of the present technology.

FIG. 12 is a diagram showing an example of applying the packet counter 180 at the time of acquiring the amount of traffic of user data for each UPF 120 in the embodiment of the present technology.

It is possible to measure the amount of traffic for each UPF 120 by mounting the packet counter 180 on a virtual machine in which each UPF 120 is implemented. The packet counter 180 measures the number of input packets and the bit counts of the packets, and the number of output packets and the bit counts of the packets. The packet counter 180 is prepared for each UPF 120. The distinction between uplink and downlink can be determined from the destination and source of a packet with reference to the source IP address and destination IP address of the packet.

FIG. 13 is a diagram showing an example of measuring the amount of traffic of user data for each UPF 120 in operation in the embodiment of the present technology.

Unlike the example of measuring the maximum amount of traffic on the communication channel described above, the amount of traffic including the amount of traffic in the wireless section is shown here. Furthermore, since the amount of traffic for uplink is different from the amount of traffic for downlink, these amounts of traffic are measured separately.

The amounts of traffic of user data being used by the UPFs 120 of the cloud are all generated from the base station 200 and the terminal 300 located on the LAN, and the LAN accounts for a large portion of a common part of the communication channel. Therefore, these amounts of traffic can be used as the degrees of congestion of traffic on the LAN.

The total sum of uplink and downlink traffic of each UPF 120 flows as traffic on the LAN. Therefore, the amount of user data traffic on the LAN is expressed by the following equation. Note that a function SUM is a function representing a sum.

Amount of User Data Traffic on LAN=SUM
(Amount of Traffic of UPF #$i$)($i$=1 to 32)

Therefore, as in the following equation, the amount of room for increasing traffic of the UPF 120 is a value obtained by subtraction of the amount of user data traffic on the LAN from the maximum capacity (812) of the LAN described above.

Amount of Room for Increasing Traffic of UPF=Maximum Capacity of LAN−Amount of User Data Traffic on LAN The amount of room for increasing traffic is the amount of traffic available when the number of the UPFs 120 is increased. Therefore, it is possible to determine whether or not to newly increase the number of the UPFs 120 by using the amount of room for increasing traffic as an index.

The amount of room for increasing traffic based on the above equation takes into consideration the amount of traffic of actual user data. Therefore, a change in the amount of traffic thereof may cause a situation where the amount differs from an original assumption. Therefore, as a simple method, assuming that a UPF program processing capacity is a fixed value of, for example, "100 Mbps", the amount of room for increasing traffic of the UPF may be obtained as the following equation.

Amount of Room for Increasing Traffic of UPF=Maximum Capacity of LAN−UPF Program Processing Capacity×Number of Operating UPFs Furthermore, in the case of the above equation, since the amount of room for increasing traffic of the UPF is under-estimated, it is possible to make adjustment by multiplying a value by an adjustment factor as in the following equation.

Amount of Room for Increasing Traffic of UPF=Maximum Capacity of LAN−UPF Program Processing Capacity×Number of Operating UPFs×Adjustment Factor Here, the adjustment factor is assumed to be about, for example, 1.0 to 0.7.

The degree of congestion on the LAN will be described as an index similar to the amount of room for increasing traffic. The degree of congestion on the LAN is expressed by the following equation.

Degree of Congestion on LAN=Amount of User Data Traffic on LAN/Maximum Capacity of LAN Note that, in the above equation, the degree of congestion on the LAN does not include traffic of a computer connected to another wireless LAN or Ethernet. This is because the above equation is based on the assumption that the private 5G/4G uses a LAN, but a computer directly connected to a conventional wireless LAN or Ethernet is not connected to the LAN. In a case where a wireless LAN or the like is also accommodated at the same time, it is necessary to consider the fact. However, here, the discussion will be continued without considering the fact. This is because there is a high possibility that the LAN for the private 5G/4G is provided as a dedicated LAN for the private 5G/4G.

As a result, here, it is possible to estimate the degree of congestion in the LAN portion without using the conventional network measurement tool and without affecting existing user data. Note that, since the degree of congestion on the LAN and the amount of room for increasing traffic of the UPF can be similarly used in practice, the amount of room for increasing traffic of the UPF is used below.

[Acquisition of Processing Usage Rate of UPF]

The acquisition of the processing usage rate of the UPF corresponds to 817 above.

The processing usage rate of the UPF is an index indicating an extent to which processing of a program implementing a target UPF is used. The processing usage rate of the UPF is expressed by the following equation.

Processing Usage Rate of UPF=Current Processing Capacity/UPF Program Processing Capacity For example, in a case where the original UPF program processing capacity is 100 Mbps and the current processing capacity is 80 Mbps, the processing usage rate of the UPF is "0.8". In addition, if the processing usage rate of a UPF is "0.0", this indicates that the UPF is not used and there remains full processing capacity. Furthermore, if the processing usage rate of a UPF is "1.0", this indicates that the UPF is completely busy and no processing capacity remains.

In addition, a method of adding a time stamp to a packet input in a target UPF and referring to the time stamp at the time of output may be used as a modification of acquisition of the processing usage rate of the UPF. In this case, processing delay of the UPF is observed with reference to the time stamp. When a processing delay of a certain period of time or more is observed, the processing usage rate of the UPF is considered high. The processing usage rate of the UPF in this case is obtained by the following equation.

Processing Usage Rate of UPF=(Current Delay−Minimum Delay)/Current Delay

The delay in this case refers to a delay time that elapses after a packet is input to the UPF and processed in the UPF before the packet is output from the UPF. The above equation indicates that the processing usage rate approaches "0" when the current delay is close to the minimum delay, and that the processing usage rate approaches "1" as the current delay increases.

[Determination on Whether to Add UPF]

The determination on whether to add a UPF corresponds to 818 above.

The resource management function 190 examines the following conditions by using all the UPFs as target UPFs. Then, in a case where the following two conditions are satisfied, it is determined that a single new UPF should be added.

Addition Condition #1: Processing Usage Rate of Target UPF>0.8

Addition Condition #2: Amount of Room for Increasing Traffic of UPF/UPF Program Processing Capacity>1.2

Addition condition π1 indicates a busy rate of processing of a target UPF. Addition condition #1 indicates that when the processing usage rate of the target UPF is greater than 0.8, processing capacity is close to a limit. Therefore, it is desirable to newly add a UPF and transfer traffic to the new UPF if possible.

Meanwhile, adding a new UPF requires a communication channel to have a sufficient capacity to accommodate new traffic generated by addition of the UPF. Addition condition #2 serves as an index thereof.

Addition condition #2 indicates whether a necessary amount of traffic is available on the LAN when the number of UPFs is increased. The amount of room for increasing traffic of the UPF in addition condition #2 is acquired in 816 above. In addition, the UPF program processing capacity in addition condition #2 is a fixed value for the UPF, and is assumed to be, for example, "100 Mbps". Note that, here, addition of a UPF is conditional on availability of a traffic amount corresponding to "1.2" UPFs in consideration of a margin, but addition of a UPF may be conditional on availability of a traffic amount corresponding to, for example, "1.0" UPF without providing a margin.

Note that only the degree of congestion on the LAN is taken into consideration in the amount of room for increasing traffic of the UPF, and thus, an error of estimation may occur in a case where a communication channel on the cloud is actually congested. However, it can be determined that it is not necessary to add a UPF on the basis of addition condition #2.

[Determination on Whether to Delete UPF]

The determination on whether to delete a UPF corresponds to 818 above.

The resource management function 190 examines the following conditions by using all the UPFs as target UPFs. Then, in a case where the following two conditions are satisfied, it is determined that a target UPF should be deleted.

Deletion Condition #1: Processing Usage Rate of Target UPF<0.1

Deletion Condition #2: at least one of UPFs other than the target UPF satisfies the following condition, Processing Usage Rate of UPF<0.5

Deletion condition #1 indicates a UPF with a low usage rate. That is, a small processing usage rate indicates that the target UPF is rarely used. There is a possibility that the UPF that is rarely used can be deleted.

Meanwhile, in a case where the UPF is deleted, it is necessary for another UPF to accommodate traffic used in the UPF. Deletion condition #2 serves as an index thereof.

Deletion condition #2 indicates that there is a UPF that may accommodate the traffic of the target UPF. That is, it is determined that there is a UPF having a small UPF processing usage rate and having room to accommodate traffic.

As is clear from the two deletion conditions, the state of traffic is not considered in determining whether to delete the UPF. This is because the traffic of the UPF to be deleted is merely accommodated in another UPF, so that it can be said that traffic does not increase at least on the LAN.

Note that, in each of the above-described steps, the number of times the state of traffic and the processing usage rates are examined may be determined carefully after, for example, taking the average of results of examination performed several times, or may be determined on the basis of a result of examination performed once.

As described above, in the first embodiment of the present technology, it is determined whether or not to newly add a UPF in consideration of the state of traffic on the LAN and the processing usage rates of the UPFs. In addition, it is determined whether or not to delete a target UPF in consideration of the processing usage rate of the target UPF and the processing usage rates of other UPFs. As a result, the resource management function 190 can flexibly control the number of UPFs according to the state of the wireless communication system. That is, addition and deletion of a UPF can be effectively determined, and a necessary number of UPFs can be provided, so that throughput (traffic amount) can be increased at a minimum necessary cost.

2. Second Embodiment

In the first embodiment described above, only the degree of congestion on a LAN is taken into consideration in the amount of room for increasing traffic of a UPF. In fact, the congestion of a communication channel may occur not only on the LAN but also on the Internet or on a cloud located on the Internet. Therefore, in a case where the cloud is congested while the LAN is not congested, an error may occur in determining that a UPF should be added.

For example, there may be a case where although the number of UPFs is increased because there is a sufficient amount of room for increasing traffic of the UPF, a communication channel on the cloud side is actually congested, so that a communication channel to be used for an added UPF does not have capacity. The same applies not only to the case of the cloud but also to a case where a path of an ISP is congested. This is because a communication channel may branch off from some point on the ISP toward each UPF.

Therefore, in a second embodiment, conditions are added for determination on whether to add a UPF and determination on whether to delete a UPF as follows.

[Determination on Whether to Add UPF]

In the second embodiment, in a case where addition conditions #1 and #2 described above are satisfied, a resource management function 190 starts a virtual machine for adding a new UPF. Then, a throughput of point-to-point communication is measured for the newly started virtual machine in a newly created subnet of the cloud by means of a network traffic amount measurement tool at a computer 420 connected to a LAN Ethernet cable. When the measured throughput satisfies addition condition #3 below, a UPF program is started on the newly added virtual machine.

Addition Condition #3: A case where a throughput of point-to-point communication for a virtual machine newly started so as to add a UPF is larger than a UPF program processing capacity.

That is, in order to add a UPF, it is necessary to newly start a virtual machine equipped with a program for the UPF. Then, a throughput up to the virtual machine is actually measured, so that it is examined whether traffic is actually in a state where there is room for increasing traffic that is equal to or greater than the processing capacity of the UPF to be added. As a result, it is possible to examine whether or not a communication channel of the ISP or the cloud is congested and there is room for carrying traffic resulting from addition of the UPF.

Figure 14:
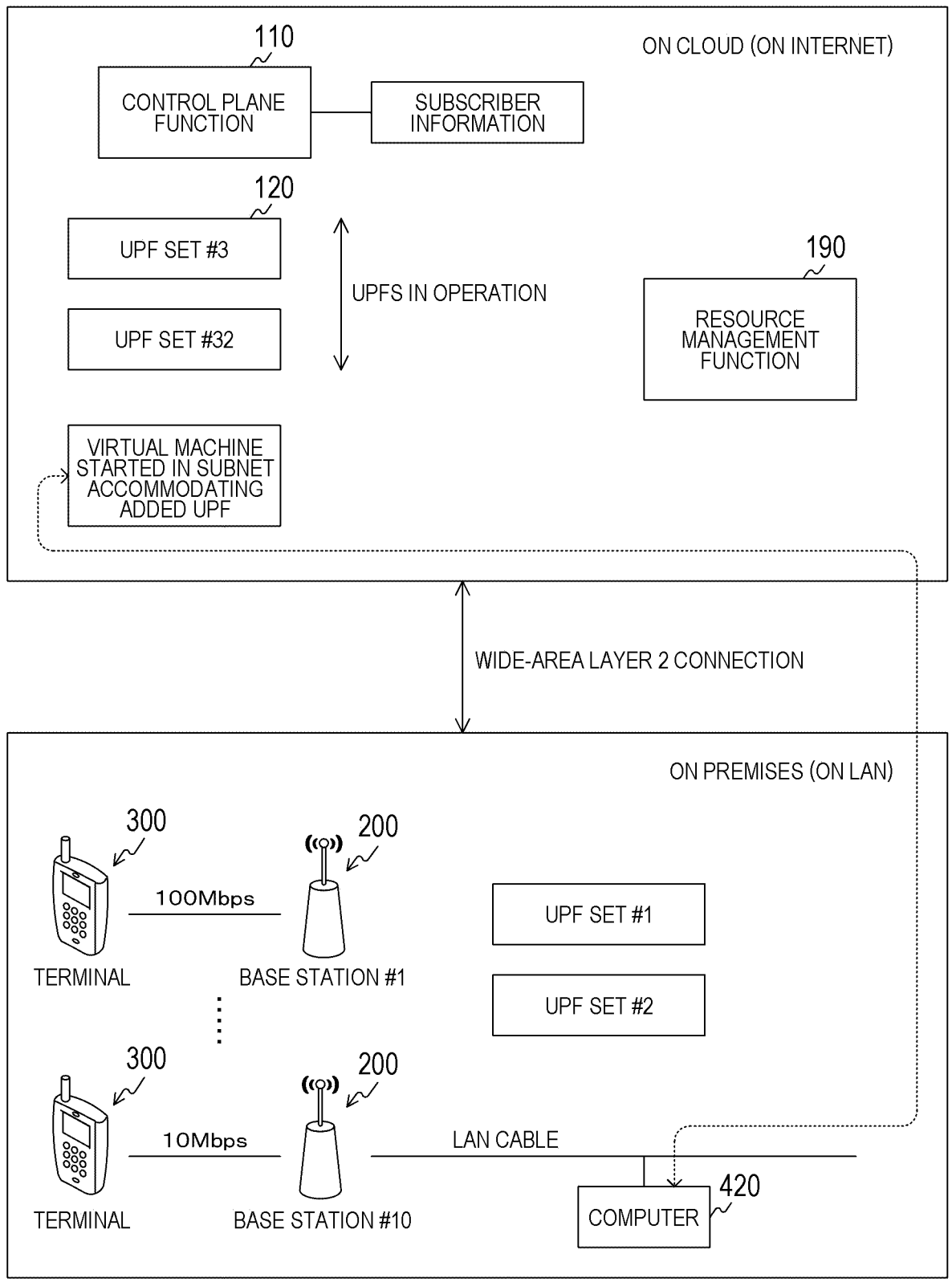
FIG. 14 is a diagram showing an exemplary mode of measuring the amount of traffic in a second embodiment of the present technology.

FIG. 14 is a diagram showing an exemplary mode of measuring the amount of traffic in the second embodiment of the present technology.

Here, a network traffic amount measurement tool such as iperf3 causes actual traffic to flow. However, this just needs to be performed only when it is determined whether or not to add a UPF. That is, since traffic measurement is performed under addition condition #3 only in a case where addition conditions #1 and #2 are satisfied, it is considered that user data in operation are less likely to be affected by traffic for traffic measurement.

Figure 15:
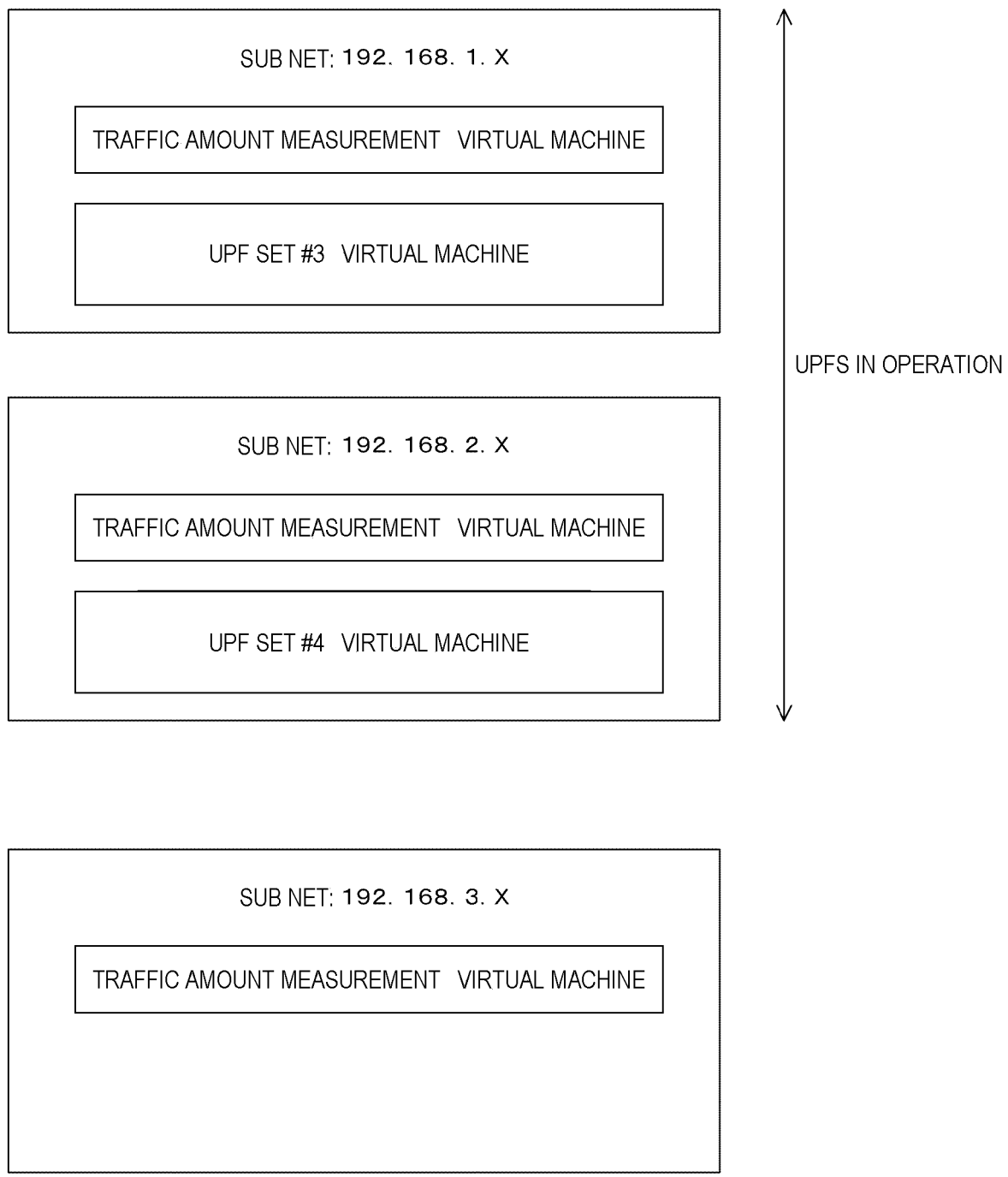
FIG. 15 is a diagram showing an example of operation being performed by UPFs when the amount of traffic is measured in the second embodiment of the present technology.

FIG. 15 is a diagram showing an example of operation being performed by UPFs when the amount of traffic is measured in the second embodiment of the present technology.

In order to accommodate a new UPF, a new subnet is added to subnets of UPFs in operation, and a traffic amount is measured for a virtual machine in the added subnet. Shown here is a state in which a virtual machine is started in the newly added subnet, for measurement to be performed by the network traffic amount measurement tool.

It is possible to take into consideration the degrees of congestion of the ISP and the cloud that cannot be seen only on the basis of addition conditions #1 and 2 by providing addition condition #3 and actually measuring the amount of traffic from the LAN to the UPF on the cloud by means of the network traffic amount measurement tool in this way. However, in this case, there is a possibility that the test traffic may affect the traffic of user data.

Therefore, a method of adding a time stamp to a packet generated in the LAN and transmitting the packet to a virtual machine newly started for a UPF to be added may be used as a modification of determination on whether to add a UPF in the second embodiment. In this case, it is possible to measure delay time that elapses before the packet arrives at the virtual machine added to the cloud from the LAN by comparing the time stamp of the packet that has arrived at the virtual machine with the current time.

That is, a packet to which a time stamp has been added is transmitted from the computer 420 connected to the LAN Ethernet cable to the newly started virtual machine in the newly created subnet on the cloud, and delay time is acquired on the basis of a difference from time at which the packet arrived at the virtual machine. Then, addition condition #3-2 related to the delay time is applied instead of addition condition #3 described above.

Addition Condition #3-2: Delay Time<Threshold of Delay Time

On the basis of addition condition #3-2, in a case where delay time is too long, it is possible to detect that the ISP or the cloud is congested. It is conceivable that delay time or the like is measured at night when traffic is not congested, and a value obtained by addition of a certain value as a margin on the basis of the measured value is used as the threshold of delay time.

Unlike addition condition #3 in the second embodiment described above, addition condition #3-2 in this modification does not require a large number of packets to be transmitted for traffic amount measurement. This brings about an advantage that existing user data are less likely to be affected.

[Determination on Whether to Delete UPF]

In the second embodiment, in a case where addition condition #3 below is satisfied in addition to addition conditions #1 and #2 described above, the resource management function 190 determines that a target UPF should be deleted. At that time, the amount of traffic is measured by means of the network traffic amount measurement tool at the computer 420 connected to the LAN Ethernet cable, for another UPF that accommodates the traffic of the target UPF to be deleted, or for a virtual machine in the same subnet as the another UPF. Whether deletion condition #3 below is satisfied is determined for the measured amount of traffic.

Deletion Condition #3: A case where the amount of traffic measured for a UPF other than the target UPF is larger than the UPF program processing capacity.

In deletion condition #3, the UPF program processing capacity is a fixed value for a UPF to be deleted, and is assumed to be, for example, "100 Mbps".

In the first embodiment described above, when a UPF is deleted under deletion conditions #1 and #2, whether or not the traffic of the deleted UPF can be accommodated in another UPF is determined on the basis of the degree of congestion on the LAN. Meanwhile, in the second embodiment, it is possible to confirm, on the basis of deletion condition #3, that there is no congestion on the cloud side by checking whether or not communication speed is actually obtained in a UPF that accommodates the traffic of the deleted UPF in place of the deleted UPF.

In the second embodiment, since the network traffic amount measurement tool is used to cause test traffic to actually flow through a communication channel, existing important user data may be affected. However, traffic is actually generated under deletion condition #3 only after it is confirmed that the degree of congestion on the LAN is low and there is free space of the communication channel corresponding to at least the UPF program processing capacity under deletion conditions #1 and #2. Therefore, it is considered that influence on user data is relatively less than in the case of using a method in which the network traffic amount measurement tool is fully used from the beginning.

Figure 16:
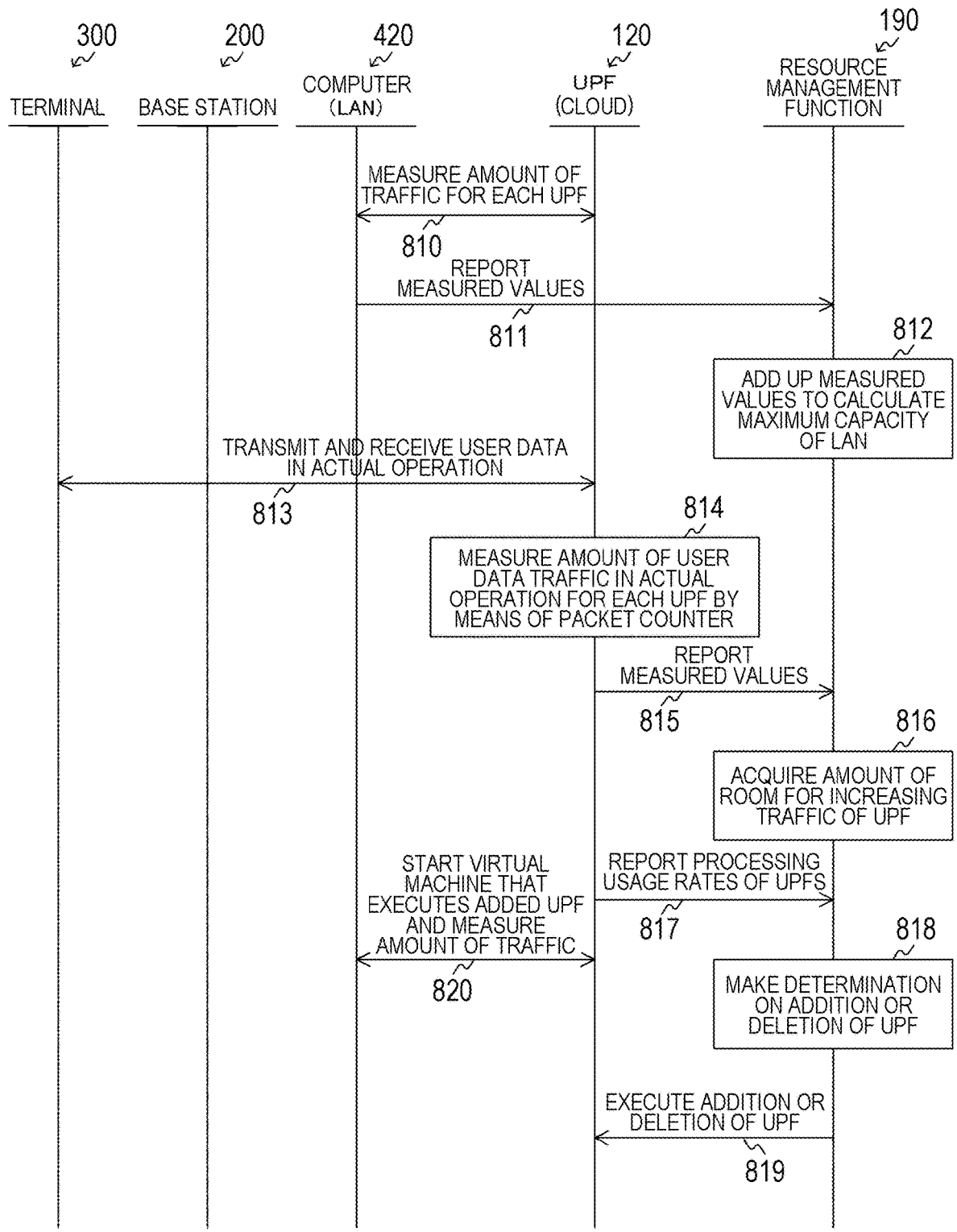
FIG. 16 is a sequence diagram showing an exemplary overall processing procedure of a wireless communication system in the second embodiment of the present technology.

FIG. 16 is a sequence diagram showing an exemplary overall processing procedure of a wireless communication system in the second embodiment of the present technology.

A step (820) of starting a virtual machine that executes an added UPF and measuring the amount of traffic, as described above in relation to addition condition #3, has been newly described in this example. Except for this point, this example is similar to the example in the first embodiment described above.

Note that traffic amount measurement to be performed at the time of adding a UPF is shown in this example, but traffic amount measurement is also required at the time of deleting a UPF so as to determine whether deletion condition #3 is satisfied.

As described above, in the second embodiment of the present technology, the actual amount of traffic is measured when a UPF is added or deleted. The influence of the amount of traffic that flows after a UPF is added or deleted is thus taken into consideration. That is, this makes it possible to avoid a situation in which expected performance cannot be achieved after addition or deletion of a UPF due to congestion occurring on a communication channel other than a communication channel on the LAN.

In some embodiments described above, the operation to be performed by the resource management function 190 may be performed by another node in the core network (for example, 5GC or EPC). For example, in place of the resource management function 190, the AMF 115, the SMF 114, a network slice selection function (NSSF), an application function (AF) in 5GC, or a combination thereof may perform the operation of the resource management function 190 described above. Additionally or alternatively, the AMF 115, the SGW 121, the PGW 122 in EPC, or a combination thereof may perform the operation of the resource management function 190 described above.

Note that the above-described embodiments are examples for embodying the present technology, and there are correspondence relationships between the matters in the embodiments and matters specifying the claimed invention. Similarly, there are correspondence relationships between the matters specifying the claimed invention and the matters in the embodiments of the present technology to which the same names have been assigned. However, the present technology is not limited to the embodiments, and it is possible to embody the present technology by making various modifications to the embodiments without departing from the scope of the present technology.

In addition, each of the processing procedures described in the embodiments above may be regarded as a method including a series of these steps, or may be regarded as a program for causing a computer to execute the series of steps or as a recording medium storing the program. For example, a compact disc (CD), a mini disc (MD), a digital versatile disc (DVD), a memory card, a Blu-ray Disc (registered trademark), or the like can be used as the recording medium.

Note that the effects described in the present specification are merely illustrative and not restrictive, and other effects may also be achieved.

Note that the present technology can also adopt the following configurations.

(1) A control apparatus to be used in a communication system in which a base station and at least one user plane function are connected, the base station being located on a local area network, the at least one user plane function being located on a cloud, in which
  whether or not to add a new user plane function is determined in consideration of an amount of traffic of user data and an assumed amount of traffic of the new user plane function out of a maximum amount of traffic on the local area network, the user data being transferred by the at least one user plane function by use of the local area network.

(2) The control apparatus according to (1) above, in which
  whether or not to add the new user plane function is determined in a case where a processing usage rate of a target user plane function exceeds a predetermined threshold, the target user plane function being among the at least one user plane function.

(3) The control apparatus according to (2) above, in which
  the processing usage rate of the target user plane function is a value to be obtained by division of a current processing capacity of the target user plane function by an assumed amount of traffic of the target user plane function.

(4) The control apparatus according to (2) above, in which
  the processing usage rate of the target user plane function is a value to be calculated on an assumption that the processing usage rate of the target user plane function increases as a longer processing delay is caused in the target user plane function.

(5) The control apparatus according to any one of (1) to (4) above, in which
  the maximum amount of traffic on the local area network is a largest value of respective amounts of traffic of the at least one user plane function, the respective amounts of traffic being measured for communication with an entity located on the local area network.

(6) The control apparatus according to any one of (1) to (5) above, in which
  the amount of traffic of the user data is a sum of respective amounts of traffic of the at least one user plane function, the respective amounts of traffic being measured for communication performed by a terminal via the base station.

(7) The control apparatus according to any one of (1) to (6) above, in which
  an amount of room for increasing traffic is calculated from the maximum amount of traffic on the local area network, and in a case where a value obtained by division of the amount of room for increasing traffic by the assumed amount of traffic of the new user plane function exceeds a predetermined value, it is determined that the new user plane function should be added.

(8) The control apparatus according to (7) above, in which
  the amount of room for increasing traffic is a value to be obtained by subtraction of the amount of traffic of the user data from the maximum amount of traffic on the local area network.

(9) The control apparatus according to (7) above, in which
  the amount of room for increasing traffic is a value to be obtained by subtraction of a traffic amount corresponding to a number of the at least one user plane function from the maximum amount of traffic on the local area network.

(10) The control apparatus according to any one of (1) to (9) above, in which
  it is determined that the new user plane function should be added, in a case where a traffic amount measured for a virtual machine in a subnet belonging to the new user plane function exceeds the assumed amount of traffic of the new user plane function, the traffic amount being measured at an entity located on the local area network.

(11) The control apparatus according to any one of (1) to (9) above, in which
  it is determined that the new user plane function should be added, in a case where a delay time measured for a virtual machine in a subnet belonging to the new user plane function is less than a predetermined delay threshold, the delay time being measured at an entity located on the local area network.

(12) The control apparatus according to any one of (1) to (11) above, in which
  whether or not to delete a target user plane function is determined in consideration of a processing usage rate of the target user plane function and processing usage rates of other user plane functions than the target user plane function, the target user plane function being among the at least one user plane function.

(13) The control apparatus according to (12) above, in which
  it is determined that the target user plane function should be deleted, in a case where the processing usage rate of the target user plane function among the at least one user plane function falls below a first threshold, and a processing usage rate of at least one of the other user plane functions than the target user plane function falls below a second threshold that is higher than the first threshold.

(14) The control apparatus according to (13) above, in which it is determined that the target user plane function should be deleted, in a case where traffic amounts measured for virtual machines in subnets belonging to the other user plane functions exceed an assumed amount of traffic of the target user plane function, the traffic amounts being measured at an entity located on the local area network.

(15) A control method to be used in a communication system in which a base station and at least one user plane function are connected, the base station being located on a local area network, the at least one user plane function being located on a cloud, the control method including:

a step of causing a control apparatus to acquire a maximum amount of traffic on the local area network;

a step of causing the control apparatus to acquire an amount of traffic of user data transferred by the at least one user plane function by use of the local area network; and a step of causing the control apparatus to determine whether or not to add a new user plane function in consideration of the maximum amount of traffic on the local area network, the amount of traffic of the user data, and an assumed amount of traffic of the new user plane function.

REFERENCE SIGNS LIST

110 Control plane function (CPF)
120 User plane function (UPF)
180 Packet counter
190 Resource management function
200 Base station
300 Terminal
410 Router
420 Computer

The invention claimed is:

1. A control apparatus to be used in a communication system in which a base station and at least one user plane function are connected, the base station being located on a local area network, the at least one user plane function being located on a cloud, wherein whether or not to add a new user plane function is determined in consideration of an amount of traffic of user data and an assumed amount of traffic of the new user plane function out of a maximum amount of traffic on the local area network, the user data being transferred by the at least one user plane function by use of the local area network.

2. The control apparatus according to claim 1, wherein whether or not to add the new user plane function is determined in a case where a processing usage rate of a target user plane function exceeds a predetermined threshold, the target user plane function being among the at least one user plane function.

3. The control apparatus according to claim 2, wherein the processing usage rate of the target user plane function is a value to be obtained by division of a current processing capacity of the target user plane function by an assumed amount of traffic of the target user plane function.

4. The control apparatus according to claim 2, wherein the processing usage rate of the target user plane function is a value to be calculated on an assumption that the processing usage rate of the target user plane function increases as a longer processing delay is caused in the target user plane function.

5. The control apparatus according to claim 1, wherein the maximum amount of traffic on the local area network is a largest value of respective amounts of traffic of the at least one user plane function, the respective amounts of traffic being measured for communication with an entity located on the local area network.

6. The control apparatus according to claim 1, wherein the amount of traffic of the user data is a sum of respective amounts of traffic of the at least one user plane function, the respective amounts of traffic being measured for communication performed by a terminal via the base station.

7. The control apparatus according to claim 1, wherein an amount of room for increasing traffic is calculated from the maximum amount of traffic on the local area network, and in a case where a value obtained by division of the amount of room for increasing traffic by the assumed amount of traffic of the new user plane function exceeds a predetermined value, it is determined that the new user plane function should be added.

8. The control apparatus according to claim 7, wherein the amount of room for increasing traffic is a value to be obtained by subtraction of the amount of traffic of the user data from the maximum amount of traffic on the local area network.

9. The control apparatus according to claim 7, wherein the amount of room for increasing traffic is a value to be obtained by subtraction of a traffic amount corresponding to a number of the at least one user plane function from the maximum amount of traffic on the local area network.

10. The control apparatus according to claim 1, wherein it is determined that the new user plane function should be added, in a case where a traffic amount measured for a virtual machine in a subnet belonging to the new user plane function exceeds the assumed amount of traffic of the new user plane function, the traffic amount being measured at an entity located on the local area network.

11. The control apparatus according to claim 1, wherein it is determined that the new user plane function should be added, in a case where a delay time measured for a virtual machine in a subnet belonging to the new user plane function is less than a predetermined delay threshold, the delay time being measured at an entity located on the local area network.

12. The control apparatus according to claim 1, wherein whether or not to delete a target user plane function is determined in consideration of a processing usage rate of the target user plane function and processing usage rates of other user plane functions than the target user plane function, the target user plane function being among the at least one user plane function.

13. The control apparatus according to claim 12, wherein it is determined that the target user plane function should be deleted, in a case where the processing usage rate of the target user plane function among the at least one user plane function falls below a first threshold, and a processing usage rate of at least one of the other user plane functions than the target user plane function falls below a second threshold that is higher than the first threshold.

14. The control apparatus according to claim 13, wherein it is determined that the target user plane function should be deleted, in a case where traffic amounts measured for virtual machines in subnets belonging to the other user plane functions exceed an assumed amount of traffic of the target user plane function, the traffic amounts being measured at an entity located on the local area network.

15. A control method to be used in a communication system in which a base station and at least one user plane function are connected, the base station being located on a local area network, the at least one user plane function being located on a cloud, the control method comprising:
- a step of causing a control apparatus to acquire a maximum amount of traffic on the local area network;
- a step of causing the control apparatus to acquire an amount of traffic of user data transferred by the at least one user plane function by use of the local area network; and
- a step of causing the control apparatus to determine whether or not to add a new user plane function in consideration of the maximum amount of traffic on the local area network, the amount of traffic of the user data, and an assumed amount of traffic of the new user plane function.

* * * * *